(12) United States Patent
Jiang et al.

(10) Patent No.: US 11,776,151 B2
(45) Date of Patent: Oct. 3, 2023

(54) METHOD FOR DISPLAYING VIRTUAL OBJECT AND ELECTRONIC DEVICE

(71) Applicant: HUAWEI TECHNOLOGIES CO., LTD., Guangdong (CN)

(72) Inventors: Jun Jiang, Shenzhen (CN); Tao Lin, Shenzhen (CN); Qi Su, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/718,734

(22) Filed: Apr. 12, 2022

(65) Prior Publication Data

US 2022/0237816 A1 Jul. 28, 2022

Related U.S. Application Data

(63) Continuation of application No. PCT/CN2020/113340, filed on Sep. 3, 2020.

(30) Foreign Application Priority Data

Nov. 8, 2019 (CN) .......................... 201911092326.0

(51) Int. Cl.
*G06T 7/70* (2017.01)
*G06T 19/00* (2011.01)

(52) U.S. Cl.
CPC .............. *G06T 7/70* (2017.01); *G06T 19/006* (2013.01)

(58) Field of Classification Search
CPC ............. G06T 7/70; G06T 2207/10016; G06T 2219/004; G06T 7/73; G06T 17/05;
(Continued)

(56) References Cited

U.S. PATENT DOCUMENTS

2013/0169626 A1 7/2013 Balan et al.
2013/0187952 A1 7/2013 Berkovich et al.
(Continued)

FOREIGN PATENT DOCUMENTS

CN 108629843 A 10/2018
CN 108765563 A 11/2018
(Continued)

OTHER PUBLICATIONS

International Search Report, Form PCT/ISA/210, for PCT/CN2020/113340, original and translation, dated Dec. 9, 2020, 6 pages. (Year: 2020).*

(Continued)

*Primary Examiner* — Jeffery A Brier
(74) *Attorney, Agent, or Firm* — HUAWEI TECHNOLOGIES CO., LTD.

(57) ABSTRACT

A method for displaying a virtual object is disclosed, applied to an electronic device (10) having a display component (323) and a camera (324). The method includes: detecting an operation of starting an application by a user; in response to the operation, downloading a global submap and storing the global submap in a simultaneous localization and mapping SLAM system of the electronic device (10), where the global submap (123) is a submap corresponding to a location of the electronic device (10) in a global map; and displaying a location and a posture of the virtual object on the display component (323), where the location and the posture of the virtual object are obtained by performing pose calculation based on at least a video image collected by the camera (324) and the global submap (123).

20 Claims, 23 Drawing Sheets

(58) Field of Classification Search
CPC .. G06V 20/20; G01C 21/3647; G09B 29/106; G06F 3/011; G06F 2203/012
See application file for complete search history.

(56) References Cited

U.S. PATENT DOCUMENTS

| | | |
|---|---|---|
| 2014/0323148 A1 | 10/2014 | Schmalstieg et al. |
| 2015/0371440 A1 | 12/2015 | Pirchheim et al. |
| 2017/0336511 A1 | 11/2017 | Nerurkar et al. |
| 2018/0249144 A1 | 8/2018 | Feng et al. |
| 2020/0068345 A1* | 2/2020 | Ondruska ............. H04W 4/023 |

FOREIGN PATENT DOCUMENTS

| | | |
|---|---|---|
| CN | 109636916 A | 4/2019 |
| CN | 109671118 A | 4/2019 |
| CN | 109767499 A | 5/2019 |
| CN | 109949422 A | 6/2019 |
| WO | 2018115897 A1 | 6/2018 |

OTHER PUBLICATIONS

Written Opinion of the International Searching Authority, Form PCT/ISA/237, for PCT/CN2020/113340, original and translation, dated Dec. 9, 2020, 10 pages. (Year: 2020).*
International Preliminary Reporton Patentability, Form PCT/IB/373, for PCT/CN2020/113340, original and translation, dated May 10, 2022, 12 pages. (Year: 2022).*
Simon Lynen et al., Large-scale, real-time visual-inertial localization revisited, arXiv 1907.00338, Jun. 30, 2019, total 21 pages.

\* cited by examiner

METHOD FOR DISPLAYING VIRTUAL OBJECT AND ELECTRONIC DEVICE

CROSS-REFERENCE TO RELATED APPLICATIONS

This application is a continuation of International Application No. PCT/CN2020/113340, filed on Sep. 3, 2020, which claims priority to Chinese Patent Application No. 201911092326.0, filed on Nov. 8, 2019. The disclosures of the aforementioned applications are hereby incorporated by reference in their entireties.

TECHNICAL FIELD

This application relates to the field of virtual scenario technologies, and in particular, to a method for displaying a virtual object and an electronic device.

BACKGROUND

Virtual reality (VR), augmented reality (AR), and mixed reality (MR) technologies are emerging multimedia virtual scenario technologies in recent years. VR is a simulated experience of creating and experiencing a virtual world. AR is an interactive experience of a combination of real and virtual worlds. MR is the merging of real and virtual worlds to produce new environments and visualizations, where real and virtual worlds and users interact in real time.

In the foregoing virtual scenario technologies, a simultaneous localization and mapping (SLAM) technology is usually used to locate an electronic device itself in an environment. The SLAM technology may specifically implement that the electronic device (for example, mobile electronic devices such as a mobile phone or VR glasses) locates itself based on an estimated location and a map in a moving process when starting to move from an unknown location in its environment, and constructs an incremental map based on its location for subsequent localization. A system or a module using the SLAM technology may also be referred to as a spatial positioning engine.

In some city-level interactive VR or AR applications, a virtual object in the VR or AR applications in a global coordinate system can be displayed on an electronic device after alignment between the global coordinate system on a server side and a local coordinate system of a SLAM system of the electronic device. However, drift occurs in a location and a posture of the electronic device in the local coordinate system over long-time running of the SLAM system. As a result, deviations also occur in a location and a direction of the virtual object displayed on the electronic device, deteriorating user experience.

SUMMARY

Embodiments of this application provide a method for displaying a virtual object and an electronic device, to resolve a problem of pose drift of the electronic device to some extent, and improve user experience.

According to a first aspect, an embodiment of this application provides a method for displaying a virtual object. The method may be applied to an electronic device having a display component (for example, a display screen (such as a touchscreen, a flexible screen, or a curved screen) or an optical component) and a camera. The electronic device may be a handheld terminal (for example, a mobile phone), VR or AR glasses, an uncrewed aerial vehicle, an unmanned vehicle, or the like. The method includes: detecting an operation of starting an application by a user; in response to the operation, downloading a global submap and storing the global submap in a simultaneous localization and mapping (SLAM) system of the electronic device, where the global submap is a submap corresponding to a location of the electronic device in a global map; and displaying a location and a posture of the virtual object on the display component, where the location and the posture of the virtual object are calculated by the SLAM system by performing pose calculation based on at least a video image collected by the camera and the global submap.

It should be noted that, pose calculation may be performed by using, for example, a BA (Bundle Adjustment) method. The posture of the virtual object may be, for example, an orientation of the virtual object.

The "operation of starting an application" may be an operation of starting an application by tapping, touching, sliding, or shaking; or may be an operation of starting an application through voice activation or other means. This is not limited in this application. For example, after the electronic device detects a touch operation of a user, a navigation function, a camera, and the like of the application are enabled.

In a possible implementation of this application, the electronic device may alternatively perform the step of downloading the global submap in another manner. For example, the electronic device performs the step of downloading the global submap by detecting changes of ambient light.

A server may serve as a platform for providing content and information support for a VR/AR/MR application on the electronic device. The global map is stored in the server. Generally, the global map is a high-definition map involving a wide geographic range. The "wide geographic range" is a concept relative to a geographic range represented by a SLAM map in the electronic device. For example, the global map may be obtained by incorporating a plurality of SLAM maps according to a rule that are generated by one or more electronic devices. Correspondingly, the global submap is a submap corresponding to the location of the electronic device in the global map. To be specific, the global submap includes map content within a preset area around a start point, where an actual location of the electronic device in the global map is used as the start point.

In this embodiment, a VR/AR/MR virtual scenario app may be installed on the electronic device, and the VR/AR/MR application may be run based on the operation (for example, tapping, touching, sliding, shaking, or voice activation) of the user. The electronic device may collect the video image in an environment by using the local camera, determine a current pose of the electronic device based on the collected video image and the downloaded global submap, and further display the location and the posture of the virtual object on the display component based on the current pose of the electronic device. The virtual object may be correspondingly a virtual object in a VR/AR/MR scenario (namely, an object in a virtual environment).

In an existing solution, the SLAM system continuously creates the SLAM map in a moving process of the electronic device, and generates a final pose of the electronic device based on a pose estimated based on the SLAM map and a pose estimated based on data collected by sensors of the SLAM system. However, noise is continuously introduced during construction of the SLAM map, that is, errors may be accumulated in the pose estimated based on the SLAM map. Noise is also introduced to the data collected by the sensors, that is, errors may also be accumulated in the pose estimated based on the data collected by the sensors. Consequently, a pose drift phenomenon occurs.

However, in this embodiment of this application, after detecting the operation of starting the application by the user, the electronic device requests to download the global submap from the server, and inputs the global submap with higher definition than the SLAM map as visual observation into the SLAM system. The SLAM system estimates the pose of the electronic device based on the global submap and the collected video image, thereby effectively reducing or even eliminating pose drift caused over long-time pose estimation performed by the SLAM system. This ensures that the location and a direction of the virtual object displayed on the electronic device do not deviate over long-time (for example, more than 1 minute) running of the VR/AR/MR application. Therefore, the virtual object is accurately displayed for a long time (for example, the virtual object is accurately displayed for a period of time under an environment represented by the video image), and user experience is improved.

In this specification, a pose of the electronic device in the global submap may also be referred to as a global pose. Accordingly, a pose of the electronic device in the SLAM map constructed by the electronic device may also be referred to as a local pose.

According to the first aspect, in a possible implementation, pose data of the electronic device is used to represent the location and the posture of the virtual object. The pose data of the electronic device is calculated by the SLAM system by performing pose calculation at a first frequency based on at least the video image collected by the camera and the global submap.

The first frequency is a frequency at which the SLAM system of the electronic device performs global pose estimation, that is, a frequency at which the SLAM system calls the global submap. For example, a value of the first frequency ranges from 10 Hz to 30 Hz, namely, 10 frames to 30 frames per second. In other words, the frequency of calling the global submap may be any value ranging from 10 to 30. The first frequency may be numerically less than or equal to a frequency at which the display component (for example, a display panel) displays a video stream.

In other words, the SLAM system of the electronic device may call the global submap at a high fixed frequency, to track or update poses of the electronic device. In this way, after the global pose (that is, the pose data) of the electronic device is obtained in real time, the location and the posture of the virtual object in the AR scenario may be displayed and updated in real time on the display component based on the global pose of the electronic device. In addition, a jumping phenomenon does not occur on the location and the posture of the virtual object over the long-time pose updating process. Reasons are as follows: During this period of time, the SLAM system of the electronic device calculates the global pose of the electronic device by accessing the stored global submap, to overcome a problem that the pre-constructed SLAM map in the electronic device is inaccurate, and maximally avoid accumulated pose errors and prevent occurrence of the drift phenomenon. In addition, the electronic device can stably and frequently perform global pose estimation by accessing the stored global submap, to greatly reduce sudden changes in the global pose. Furthermore, the global pose calculation process is completed on the electronic device side, so that a delay of pose estimation algorithms is low, and pose tracking effects are good. Therefore, in this embodiment, the virtual object can be accurately displayed for a long time without incurring deviations and errors in screens, and the jumping phenomenon of the virtual object resulting from sudden changes in poses can be eliminated. This further improves user experience.

In this embodiment of this application, the SLAM map may include: a plurality of key frames, feature points obtained through triangulation, and association between the key frames and the feature points. The key frames may be obtained based on images collected by the camera and a camera parameter (for example, a pose of the electronic device in the SLAM coordinate system) for generating the images. The feature points may represent different 3D map points in three-dimensional space in the SLAM map and feature descriptions about the 3D map points. Each of the feature points may have an associated feature location. Each of the feature points may represent a 3D coordinate location and is associated with one or more descriptors. The feature point may also be referred to as a 3D feature, a feature point, a 3D feature point, or another suitable name.

The 3D map point (or referred to as a three-dimensional map point) represents coordinates in axes X, Y, and Z in the three-dimensional space. For example, for a SLAM map in a local coordinate system, a 3D map point represents coordinates in axes X, Y, and Z in three-dimensional space of the local coordinate system. For a SLAM map in a global coordinate system, a 3D map point represents coordinates in axes X, Y, and Z in three-dimensional space of the global coordinate system.

According to the first aspect, in a possible implementation, a pose calculation process includes: performing pose calculation based on the video image collected by the camera, the global submap, and motion data collected by the electronic device, to obtain the pose data of the electronic device, where the motion data includes motion speed data and motion direction data.

In this embodiment, the motion data collected by the electronic device may be, for example, motion data collected by an inertial measurement unit (IMU) in the electronic device. The IMU may collect information such as an angular velocity and a linear acceleration of the electronic device at a high frequency. An integral operation is performed on the angular acceleration, the linear acceleration, and the like to estimate the pose of the electronic device. The electronic device may call, based on the collected video image and the motion data collected by the IMU at a high frequency, the 3D features (the 3D map points) of the global submap at a high frequency by using a SLAM algorithm, to further improve accuracy of the estimated global pose by introducing the IMU. This ensures that the 3D features (the 3D map points) of the global submap are effectively used as measured values applied to a SLAM algorithm, and avoids the pose drift and jumping phenomena by performing high-precision pose estimation.

According to the first aspect, in a possible implementation, the downloading a global submap in response to the operation includes: in response to the operation, sending, to a server, indication information indicating an initial location of the electronic device; and receiving the global submap from the server, where the global submap is determined based on the initial location of the electronic device.

In this embodiment of this application, the global submap is requested to be downloaded by uploading the indication information indicating the initial location of the electronic device, without a need to upload the video image. In this way, the global submap related to the initial location of the electronic device can be obtained, thereby saving bandwidth resources, reducing processing load of the server, and further reducing or eliminating privacy breach risks.

According to the first aspect, in a possible implementation, the indication information indicating the initial location of the electronic device includes first location fingerprint information used to indicate the initial location of the electronic device, the global submap corresponds to second location fingerprint information, and the first location fingerprint information matches the second location fingerprint information.

The initial location indicated by the location fingerprint information may be geographic location information of the electronic device generated when the electronic device requests to download the map. For example, the location fingerprint information may be initial location information, signal strength information, or signal feature information measured through GNSS/Wi-Fi/Bluetooth/base station positioning; or the location fingerprint information may be location information input by a user.

In this embodiment of this application, the server performs matching between the uploaded location fingerprint information and location fingerprint information of the global submap, so that a useful global submap can be downloaded to the electronic device side. This improves matching efficiency and accuracy, and further helps reduce a delay for downloading a map.

According to the first aspect, in a possible implementation, the method further includes: The electronic device updates a SLAM map of the SLAM system based on the pose data of the electronic device.

Specifically, the SLAM map may be first converted to a coordinate system (namely, the global coordinate system) corresponding to the global submap. In this way, both the pose of the electronic device and the SLAM map are already in the global coordinate system, and therefore the electronic device may feed back the global pose of the electronic device into the SLAM map in the global coordinate system, and fuse a current image frame (a key frame) into the SLAM map in the global coordinate system based on the global pose, to expand/extend the SLAM map. Therefore, the updated SLAM map is more accurate than the conventional SLAM map.

According to the first aspect, in a possible implementation, before the updating a SLAM map of the SLAM system based on the pose data of the electronic device, the method further includes: determining first pose data of the electronic device in a SLAM map in a first coordinate system based on the $K^{th}$ frame of image in the video image collected by the camera and the SLAM map in the first coordinate system, where K is an integer greater than or equal to 1; determining second pose data of the electronic device in a global submap in a second coordinate system based on the $K^{th}$ frame of image and the global submap in the second coordinate system; obtaining coordinate system transform information between the first coordinate system of the SLAM map and the second coordinate system of the global map based on the first pose data and the second pose data; and transforming the SLAM map in the first coordinate system into a SLAM map in the second coordinate system based on the coordinate system transform information. Correspondingly, the updating a SLAM map of the SLAM system based on the pose data of the electronic device includes: updating the SLAM map in the second coordinate system by using the pose data of the electronic device as pose data of the electronic device in the SLAM map in the second coordinate system.

The $K^{th}$ frame of image is a frame in a video image sequence collected by the camera. It should be understood that the video image collected by the camera may be a video sequence (a video stream), and may include a plurality of frames of images, and the $K^{th}$ frame of image may be a frame in the video stream.

In this specification, a coordinate system used for constructing the SLAM map may be referred to as the first coordinate system. In some application scenarios, the first coordinate system in this specification may also be referred to as a local coordinate system, a SLAM coordinate system, a camera coordinate system, or another suitable name. Correspondingly, a pose of the electronic device presented in the local coordinate system may be referred to as a local pose.

A coordinate system used for constructing the global map may be referred to as the second coordinate system. In some application scenarios, the second coordinate system in this specification may also be referred to as a global coordinate system, a world coordinate system, or another suitable name. Correspondingly, a pose of the electronic device presented in the global coordinate system may be referred to as a global pose.

The pose data of the electronic device is pose data of the electronic device in the first coordinate system or pose data of the electronic device in the second coordinate system. The first coordinate system is a coordinate system of the SLAM map of the SLAM system, and the second coordinate system is a coordinate system of the global submap.

In this embodiment of this application, the pose of the terminal in the local coordinate system and the pose of the terminal in the global coordinate system are separately obtained based on a same frame. Coordinate system transform information (for example, a coordinate system transform matrix) between the two coordinate systems can be obtained based on the two poses, so that synchronization between the two coordinate systems can be implemented based on the coordinate system transform matrix. In this way, information (for example, the local pose, the feature points of images, the 3D map points in the SLAM map) previously represented in the local coordinate system can be transformed to information in the global coordinate system based on the coordinate system transform matrix. In this way, the pose and the 3D map points in the SLAM system can be represented in a same coordinate system as the 3D map points in the global submap. Further, the 3D map points in the global submap may be input into the SLAM system as measured values, thereby implementing tight coupling between the global submap and the SLAM system. Furthermore, the global pose of the electronic device is tracked in real time through pose estimation, thereby effectively eliminating drift in SLAM pose tracking. When the SLAM map needs to be subsequently updated, the global pose of the electronic device may be used as pose data of the electronic device in the SLAM map in the global coordinate system to update the SLAM map in the second coordinate system.

According to the first aspect, in a possible implementation, the determining first pose data of the electronic device in a SLAM map in a first coordinate system based on the $K^{th}$ frame of image in the video image collected by the camera and the SLAM map in the first coordinate system includes: obtaining the first pose data of the electronic device in the SLAM map in the first coordinate system based on the $K^{th}$ frame of image, the SLAM map in the first coordinate system, and the motion data collected by the electronic device, where the motion data includes the motion speed data and the motion direction data.

For example, the IMU is disposed in the electronic device, and an input signal of the SLAM system includes the video image collected by the camera, the motion data collected by the IMU, and the SLAM map in the local coordinate system. The IMU detects the angular velocity and the linear acceleration of the electronic device at a high frequency, and separately performs an integral operation on the angular acceleration and the linear acceleration, to calculate the pose of the electronic device. Matching is performed on the video image collected by the camera in the SLAM map in the local coordinate system, so that the pose of the electronic device may alternatively be calculated. Therefore, the first pose data may be obtained based on the two poses according to an algorithm.

For another example, a pose-related or motion-related positioning (GPS/BeiDou/Wi-Fi/base station positioning) module is further disposed in the electronic device, in addition to the camera and the IMU. Therefore, the SLAM system may further calculate the first pose data based on the video image collected by the camera, the motion data collected by the IMU, the SLAM map in the local coordinate system, and data collected by the positioning module. This further improves accuracy of the first pose data.

According to the first aspect, in a possible implementation, the determining second pose data of the electronic device in a global submap in a second coordinate system based on the $K^{th}$ frame of image and the global submap in the second coordinate system includes:

performing feature extraction based on the $K^{th}$ frame of image, to obtain an image feature; performing feature matching on the image feature in the global submap in the second coordinate system, to obtain a map feature matching the image feature; and calculating the second pose data of the electronic device in the global submap in the second coordinate system based on the image feature and the map feature.

For example, the electronic device performs feature detection on the $K^{th}$ frame of image, and extracts an image location of a feature from the $K^{th}$ frame of image, where feature detection algorithms include but are not limited to FAST, ORB, SIFT, SURF, D2Net, and SuperPoint. Then, the electronic device describes each detected feature, to obtain a one-dimensional vector for subsequent feature matching, where feature description algorithms may include but are not limited to ORB, SIFT, SURF, BRIEF, BRISK, FREAK, D2Net, and SuperPoint. The electronic device may obtain, from the global submap through feature matching, map content (for example, one or more frames of key frames) most similar to the $K^{th}$ image frame, where specific methods include conventional image retrieval methods such as BOW and VLAD and novel image retrieval methods such as NetVLAD and AI. After finding the map content most similar to the $K^{th}$ frame image, the electronic device may perform pose estimation based on the $K^{th}$ frame image and the most similar map content, and calculate the second pose data according to registration algorithms such as PnP, EPnP, and 3D-3D.

This embodiment of this application can be implemented on the electronic device side, so that a computing capability of the electronic device can be fully utilized to calculate the first pose data and the second pose data. This improves processing efficiency and reduces computing load of the server.

According to the first aspect, in a possible implementation, the determining second pose data of the electronic device in a global submap in a second coordinate system based on the $K^{th}$ frame of image and the global submap in the second coordinate system includes:

sending the $K^{th}$ frame of image to the server; and receiving the second pose data from the server, where the second pose data is determined by the server by performing feature extraction and feature matching based on the $K^{th}$ frame of image and the global submap in the second coordinate system.

The $K^{th}$ frame of image may be the first frame of image in the video image sequence photographed by the camera.

In this embodiment, as the electronic device needs to first download a global submap of a corresponding area, it takes some time to download the map. To speed up user's access to an application, first global pose estimation may be completed on the server side. To be specific, the first global pose estimation is performed on the server side after the application is started. While the global pose estimation is started, the server correspondingly obtains the global submap and transmits the global submap to the electronic device. This speeds up user's access to the application. In this way, the user does not perceive a delay resulting from downloading the map, thereby improving user experience as the user does not need to wait.

According to the first aspect, in a possible implementation, the displaying a location and a posture of the virtual object on the display component includes: displaying a first interface on the display component, and displaying the video stream and the virtual object in the first interface, where the location and the posture of the virtual object relative to the video stream are displayed based on the pose data of the electronic device, and the pose data of the electronic device is calculated by executing the pose calculation process based on at least the video image collected by the camera and the global submap.

The location and the posture of the virtual object relative to the video stream are, for example, the location and the posture of the virtual object superimposed onto the video stream. The location and the posture of the virtual object superimposed onto the video stream are displayed based on the pose data of the electronic device, and the pose data of the electronic device is obtained by performing pose calculation processing based on at least the video stream collected by the camera and the global submap.

For example, an AR application may generate the virtual object by using computer graphics and visualization technologies, and superimpose the virtual object in a viewfinder frame onto a video stream in the viewfinder frame based on a current global pose of the electronic device. That is, the location and the posture of the virtual object superimposed onto the video stream are displayed based on the pose data of the electronic device. The pose data of the electronic device is obtained by performing pose calculation processing based on at least the video stream collected by the camera and the global submap.

It should be noted that the solution of this application may also be applied to a VR scenario (for example, applied to VR glasses). In the VR scenario, only a virtual object but no video stream in the real environment may be displayed on a display screen.

According to a second aspect, an embodiment of this application provides another method for displaying a virtual object, applied to an electronic device having a display component and a camera. The electronic device may be a handheld terminal (for example, a mobile phone), VR or AR glasses, an uncrewed aerial vehicle, an unmanned vehicle, or the like. The method includes: obtaining a global submap and storing the global submap in a simultaneous localization and mapping (SLAM) system of the electronic device, where the global submap is a submap corresponding to a location of the electronic device in the global map; performing pose calculation based on the global submap and a video image collected by the camera, to obtain pose data of the electronic device; and displaying the virtual object on the display component (or displaying a location and a posture of the virtual object on the display component) based on the pose data of the electronic device.

The pose data of the electronic device may be pose data in a first coordinate system (a local coordinate system for generating a SLAM map by the SLAM system), or pose data in a second coordinate system (a global coordinate system corresponding to the global submap).

In this embodiment, the electronic device may download the global submap from a server, collect the video image in an environment by using the local camera, determine a current pose of the electronic device based on the collected video image and the downloaded global submap, and further display the location and the posture of the virtual object on the display component based on the current pose of the electronic device. The virtual object may be correspondingly a virtual object in a VR/AR/MR scenario (namely, an object in a virtual environment). The display component of the electronic device may specifically include a display panel, lenses (for example, VR glasses), a projection screen, or the like.

Generally, a global map is a high-definition map involving a wide geographic range, and the "wide geographic range" is a concept relative to a geographic range represented by the SLAM map in the electronic device. For example, the global map may be obtained by incorporating a plurality of SLAM maps according to a rule that are generated by one or more electronic devices. Correspondingly, the global submap is a submap corresponding to the location of the electronic device in the global map. To be specific, the global submap includes map content within a preset area around a start point, where an actual location of the electronic device in the global map is used as the start point.

In this embodiment of this application, the electronic device requests to download the global submap from the server, and inputs the global submap with higher definition than the SLAM map as visual observation into the SLAM system. The SLAM system estimates the pose of the electronic device based on the global submap, thereby effectively reducing or even eliminating pose drift caused over long-time pose estimation performed by the SLAM system. This ensures that the location and a direction of the virtual object displayed on the electronic device do not deviate over long-time (for example, more than 1 minute) running of the VR/AR/MR application. Therefore, the virtual object is accurately displayed for a long time (for example, the virtual object is accurately displayed for a period of time under an environment represented by the video image), and user experience is improved.

According to the second aspect, in a possible implementation, the performing pose calculation based on the global submap and a video image collected by the camera, to obtain pose data of the electronic device includes: performing pose calculation at a first frequency based on at least the video image collected by the camera and the global submap, to obtain the pose data of the electronic device.

The first frequency is a frequency at which the SLAM system of the electronic device performs global pose estimation, that is, a frequency at which the SLAM system calls the global submap. The first frequency may be numerically less than or equal to a frequency at which the display panel displays a video stream. For example, a value of the first frequency ranges from 10 Hz to 30 Hz, namely, 10 frames to 30 frames per second. In other words, the frequency of calling the global submap may be any value from 10 to 30.

In other words, the SLAM system of the electronic device may call the global submap at a high fixed frequency, to track poses of the electronic device. In this way, after the global pose of the electronic device is obtained in real time, the location and the posture of the virtual object in the AR scenario may be displayed and updated in real time on the display component based on the global pose of the electronic device. In addition, a jumping phenomenon does not occur on the location and the posture of the virtual object over the long-time pose updating process. Reasons are as follows: During this period of time, the SLAM system of the electronic device calculates the global pose of the electronic device based on the global submap, to overcome a problem that the pre-constructed SLAM map in the electronic device is inaccurate, and maximally avoid accumulated pose errors and prevent occurrence of the drift phenomenon. In addition, the electronic device can stably and frequently perform global pose estimation based on the global submap, thereby greatly reducing sudden changes in the global pose. Furthermore, the global pose calculation process is completed on the electronic device side, so that a delay of pose estimation algorithms is low, and pose tracking effects are good. Therefore, in this embodiment, the virtual object can be accurately displayed for a long time without incurring deviations and errors in screens, and a jumping phenomenon of the virtual object resulting from sudden changes in poses can be eliminated. This further improves user experience.

According to the second aspect, in a possible implementation, the pose data of the electronic device is pose data of the electronic device in the first coordinate system or pose data of the electronic device in the second coordinate system. The first coordinate system is a coordinate system of the SLAM map of the SLAM system, and the second coordinate system is a coordinate system of the global submap.

According to the second aspect, in a possible implementation, the performing pose calculation based on the global submap and a video image collected by the camera, to obtain pose data of the electronic device includes: performing pose calculation based on the video image collected by the camera, the global submap, and motion data collected by the electronic device, to obtain the pose data of the electronic device, where the motion data includes motion speed data and motion direction data. The motion data collected by the electronic device may be, for example, motion data collected by an inertial measurement unit (IMU) in the electronic device, to further improve accuracy of the estimated global pose by introducing the IMU. This ensures that 3D features of the global submap are effectively used as measured values applied to a SLAM algorithm, and avoids the pose drift and jumping phenomena by performing high-precision pose estimation.

According to the second aspect, in a possible implementation, the method further includes: The electronic device updates a SLAM map of the SLAM system based on the pose data of the electronic device.

According to the second aspect, in a possible implementation, before the updating a SLAM map of the SLAM system based on the pose data of the electronic device, the method further includes: determining first pose data of the electronic device in a SLAM map in a first coordinate system based on the $K^{th}$ frame of image in the video image collected by the camera and the SLAM map in the first coordinate system, where K is an integer greater than or equal to 1; determining second pose data of the electronic device in a global submap in a second coordinate system based on the $K^{th}$ frame of image and the global submap in the second coordinate system; obtaining coordinate system transform information between the first coordinate system of the SLAM map and the second coordinate system of the global map based on the first pose data and the second pose data; and transforming the SLAM map in the first coordinate system into a SLAM map in the second coordinate system based on the coordinate system transform information. Correspondingly, the updating a SLAM map of the SLAM system based on the pose data of the electronic device includes: updating the SLAM map in the second coordinate system by using the pose data of the electronic device as pose data of the electronic device in the SLAM map in the second coordinate system.

In this embodiment of this application, the pose of the terminal in the local coordinate system and the pose of the terminal in the global coordinate system are separately obtained based on a same frame. Coordinate system transform information (for example, a coordinate system transform matrix) between the two coordinate systems can be obtained based on the two poses, so that synchronization between the two coordinate systems can be implemented based on the coordinate system transform matrix. In this way, information (for example, the local pose, feature points of images, 3D map points in the SLAM map) previously represented in the local coordinate system can be transformed to information in the global coordinate system based on the coordinate system transform matrix. In this way, the pose and the 3D map points in the SLAM system can be represented in a same coordinate system as the 3D map points in the global submap. Further, the 3D map points in the global submap may be input into the SLAM system as measured values, thereby implementing tight coupling between the global submap and the SLAM system. Furthermore, the global pose of the electronic device is tracked in real time through pose estimation, thereby effectively eliminating drift in SLAM pose tracking. When the SLAM map needs to be subsequently updated, the global pose of the electronic device may be used as pose data of the electronic device in the SLAM map in the global coordinate system to update the SLAM map in the second coordinate system.

According to the second aspect, in a possible implementation, the obtaining a global submap of a global map includes: sending, to a server, first location fingerprint information indicating an initial location of the electronic device; and receiving the global submap from the server, where the global submap corresponds to second location fingerprint information, and the first location fingerprint information matches the second location fingerprint information. The server performs a map matching operation, so that matching efficiency and precision are improved, and a delay in downloading the map is reduced.

According to the second aspect, in a possible implementation, the virtual object is a virtual object in a virtual reality VR scenario, an augmented reality AR scenario, or a mixed reality MR scenario.

According to a third aspect, an embodiment of this application provides an electronic device for displaying a virtual object, including an interaction module, a data collection module, a communication module, and a SLAM module.

The interaction module is configured to detect an operation of starting an application by a user.

The communication module is configured to: in response to the operation, download a global submap and store the global submap in a simultaneous localization and mapping (SLAM) system of the electronic device, where the global submap is a submap corresponding to a location of the electronic device in a global map.

The interaction module is further configured to display a location and a posture of the virtual object on a display component, where the location and the posture of the virtual object are calculated by the SLAM module by performing pose calculation based on at least a video image collected by the data collection module and the global submap.

The SLAM module may be a SLAM system described in the embodiments of this application, for example, a SLAM system 12 described in the following embodiments of this specification.

According to the third aspect, in a possible implementation, pose data of the electronic device is used to represent the location and the posture of the virtual object. The pose data of the electronic device is calculated by the SLAM module by performing pose calculation at a first frequency based on at least the video image collected by the data collection module and the global submap.

According to the third aspect, in a possible implementation, a process in which the SLAM module performs pose calculation includes:
performing pose calculation based on the video image collected by the data collection module, the global submap, and motion data collected by the data collection module, to obtain the pose data of the electronic device, where the motion data includes motion speed data and motion direction data.

According to the third aspect, in a possible implementation, the communication module is specifically configured to: in response to the operation, send, to a server, indication information indicating an initial location of the electronic device; and receive the global submap from the server, where the global submap is determined based on the initial location of the electronic device.

According to the third aspect, in a possible implementation, the indication information indicating the initial location of the electronic device includes first location fingerprint information used to indicate the initial location of the electronic device, the global submap corresponds to second location fingerprint information, and the first location fingerprint information matches the second location fingerprint information.

According to the third aspect, in a possible implementation, the SLAM module is further configured to update a SLAM map of the SLAM module based on the pose data of the electronic device.

According to the third aspect, in a possible implementation, the electronic device further includes a global localization module and a coordinate system transform matrix calculation module.

The SLAM module is specifically configured to determine first pose data of the electronic device in the SLAM map in a first coordinate system based on the $K^{th}$ frame of image in the video image collected by the data collection module and the SLAM map in the first coordinate system, where K is an integer greater than or equal to 1

The global localization module is specifically configured to determine second pose data of the electronic device in the global submap in a second coordinate system based on the $K^{th}$ frame of image and the global submap in the second coordinate system.

The coordinate system transform matrix calculation module is specifically configured to obtain coordinate system transform information between the first coordinate system of the SLAM map and the second coordinate system of the global map based on the first pose data and the second pose data.

The SLAM module is further configured to: transform the SLAM map in the first coordinate system into a SLAM map in the second coordinate system based on the coordinate system transform information, and update the SLAM map in the second coordinate system by using the pose data of the electronic device as pose data of the electronic device in the SLAM map in the second coordinate system.

According to the third aspect, in a possible implementation, the SLAM module is specifically configured to obtain the first pose data of the electronic device in the SLAM map in the first coordinate system based on the $K^{th}$ frame of image, the SLAM map in the first coordinate system, and the motion data collected by the data collection module, where the motion data includes the motion speed data and the motion direction data.

According to the third aspect, in a possible implementation, the global localization module is specifically configured to: perform feature extraction based on the $K^{th}$ image frame to obtain an image feature; perform feature matching on the image feature in the global submap in the second coordinate system, to obtain a map feature matching the image feature; and calculate the second pose data of the electronic device in the global submap in the second coordinate system based on the image feature and the map feature.

According to the third aspect, in a possible implementation, the communication module is further configured to: send the $K^{th}$ frame of image to a server; and receive the second pose data from the server, where the second pose data is determined by the server by performing feature extraction and feature matching based on the $K^{th}$ frame of image and the global submap in the second coordinate system.

According to the third aspect, in a possible implementation, the interaction module is specifically configured to: display a first interface on the display component, and display a video stream and the virtual object in the first interface, where the location and the posture of the virtual object relative to the video stream are displayed based on the pose data of the electronic device, and the pose data of the electronic device is calculated by executing the pose calculation process based on at least the video image collected by the data collection module and the global submap.

According to a fourth aspect, an embodiment of this application provides an electronic device for displaying a virtual object, including an interaction module, a data collection module, a communication module, and a SLAM module.

The communication module is configured to obtain a global submap and store the global submap in a simultaneous localization and mapping (SLAM) system of the electronic device, where the global submap is a submap corresponding to a location of the electronic device in a global map.

The SLAM module is configured to perform pose calculation based on a video image collected by the data collection module and the global submap, to obtain pose data of the electronic device.

The interaction module is configured to display the virtual object on the display component based on the pose data of the electronic device.

The SLAM module may be a SLAM system described in the embodiments of this application, for example, a SLAM system 12 described in the following embodiments of this specification.

According to the fourth aspect, in a possible implementation, the SLAM module is specifically configured to perform pose calculation at a first frequency based on at least the video image collected by the data collection module and the global submap, to obtain the pose data of the electronic device.

According to the fourth aspect, in a possible implementation, the pose data of the electronic device is pose data of the electronic device in a first coordinate system or pose data of the electronic device in a second coordinate system. The first coordinate system is a coordinate system of a SLAM map of the SLAM module, and the second coordinate system is a coordinate system of the global submap.

According to the fourth aspect, in a possible implementation, the SLAM module is specifically configured to perform pose calculation based on the video image collected by the data collection module, the global submap, and motion data collected by the data collection module, to obtain the pose data of the electronic device, where the motion data includes motion speed data and motion direction data.

According to the fourth aspect, in a possible implementation, the SLAM module is further configured to update the SLAM map of the SLAM module based on the pose data of the electronic device.

According to the fourth aspect, in a possible implementation, the electronic device further includes a global localization module and a coordinate system transform matrix calculation module.

The SLAM module is specifically configured to determine first pose data of the electronic device in the SLAM map in a first coordinate system based on the $K^{th}$ frame of image in the video image collected by the data collection module and the SLAM map in the first coordinate system, where K is an integer greater than or equal to 1

The global localization module is specifically configured to determine second pose data of the electronic device in the global submap in a second coordinate system based on the $K^{th}$ frame of image and the global submap in the second coordinate system.

The coordinate system transform matrix calculation module is specifically configured to obtain coordinate system transform information between the first coordinate system of the SLAM map and the second coordinate system of the global map based on the first pose data and the second pose data.

The SLAM module is further configured to: transform the SLAM map in the first coordinate system into a SLAM map in the second coordinate system based on the coordinate system transform information, and update the SLAM map in the second coordinate system by using the pose data of the electronic device as pose data of the electronic device in the SLAM map in the second coordinate system.

According to the fourth aspect, in a possible implementation, the communication module is further configured to send, to a server, first location fingerprint information indicating an initial location of the electronic device; and receive the global submap from the server, where the global submap corresponds to second location fingerprint information, and the first location fingerprint information matches the second location fingerprint information.

According to the fourth aspect, in a possible implementation, the virtual object is a virtual object in a virtual reality VR scenario, an augmented reality AR scenario, or a mixed reality MR scenario.

According to a fifth aspect, an embodiment of this application provides an electronic device for displaying a virtual object, including a display component, a camera, one or more processors, a memory, one or more applications, and one or more computer programs. The one or more computer programs are stored in the memory, the one or more computer programs include instructions. When the instructions are executed by the electronic device, the electronic device is enabled to perform the method for displaying a virtual object described in any one of the first aspect or the possible implementations of the first aspect.

According to a sixth aspect, an embodiment of this application provides an electronic device for displaying a virtual object, including a display component, a camera, one or more processors, a memory, and one or more computer programs. The one or more computer programs are stored in the memory, the one or more computer programs include instructions. When the instructions are executed by the electronic device, the electronic device is enabled to perform the method for displaying a virtual object described in any one of the second aspect or the possible implementations of the second aspect.

According to a seventh aspect, an embodiment of this application provides a chip. The chip includes a processor and a data interface. The processor reads, via the data interface, instructions stored in a memory, to perform the method for displaying a virtual object described in any one of the first aspect or the possible implementations of the first aspect.

Optionally, in an implementation, the chip may further include the memory. The memory stores the instructions, and the processor is configured to execute the instructions stored in the memory. When the instructions are executed, the processor is configured to perform the method for displaying a virtual object described in any one of the first aspect or the possible implementations of the first aspect.

According to an eighth aspect, an embodiment of this application provides a chip. The chip includes a processor and a data interface. The processor reads, via the data interface, instructions stored in a memory, to perform the method for displaying a virtual object described in any one of the second aspect or the possible implementations of the second aspect.

Optionally, in an implementation, the chip may further include the memory. The memory stores the instructions, and the processor is configured to execute the instructions stored in the memory. When the instructions are executed, the processor is configured to perform the method for displaying a virtual object described in any one of the second aspect or the possible implementations of the second aspect.

According to a ninth aspect, an embodiment of this application provides a computer-readable storage medium. The computer-readable medium stores program code for execution by a device. The program code includes instructions used to perform the method described in any one of the first aspect or the possible implementations of the first aspect; or the program code includes instructions used to perform the method described in any one of the second aspect or the possible implementations of the second aspect.

According to a tenth aspect, an embodiment of the present invention provides a computer program product. The computer program product may be a software installation package, and the computer program product includes program instructions. When the computer program product is executed by an electronic device, a processor of the electronic device performs the method described in any one of the first aspect, the second aspect, the possible implementations of the first aspect, or the possible implementations of the second aspect.

It may be learned that, by implementing this embodiment of this application, the electronic device requests to download the global submap from the server, and inputs the global submap with higher definition than the SLAM map as visual observation into the SLAM system. The SLAM system of the electronic device may call the global submap at a high fixed frequency, to track poses of the electronic device. In this way, after the global pose of the electronic device is obtained in real time, the location and the posture of the virtual object in the AR scenario may be displayed and updated in real time on the display component based on the global pose of the electronic device. In addition, the drift or jumping phenomenon does not occur on the location and the posture of the virtual object over the long-time pose updating process.

BRIEF DESCRIPTION OF DRAWINGS

To describe technical solutions in embodiments of this application or in the background more clearly, the following briefly describes the accompanying drawings used for describing the embodiments of this application or the background.

DESCRIPTION OF EMBODIMENTS

The following describes the embodiments of this application with reference to the accompanying drawings in the embodiments of this application. Terms used in implementations of this application are merely intended to explain specific embodiments of this application, and are not intended to limit this application. In the specification, claims, and accompanying drawings of this application, terms such as "first", "second", "third", and "fourth" are intended to distinguish between different objects but do not indicate a particular order. In embodiments of this application, the words such as "example" or "for example" are used to represent giving an example, an illustration, or a description. Any embodiment or design scheme described as "example" or "for example" in the embodiments of this application should not be explained as being more preferred or having more advantages than another embodiment or design scheme. Specifically, use of "example" or "for example" is intended to present a related concept in a specific manner.

The terms "a" and "the" of singular forms used in the embodiments and the appended claims of this application are also intended to include plural forms, unless otherwise specified in the context clearly. It should be further understood that the term "and/or" used in this specification indicates and includes any or all possible combinations of one or more associated listed items. As used herein, "a", "a specific", and "the" in the singular form are intended to include the plural form as well, unless otherwise specified in the context clearly. It will also be understood that the terms "including", "having", "comprising", and/or "contain" when used specify the existence of a stated feature, integer, step, operation, element, and/or component, but this does not exclude the existence or addition of one or more other features, integers, steps, operations, features, components, and/or groups thereof.

It should be noted that the terms used in the embodiments of this application are merely for the purpose of illustrating specific embodiments, and are not intended to limit this application.

An application architecture used in the embodiments of this application is first described.

Figure 1:
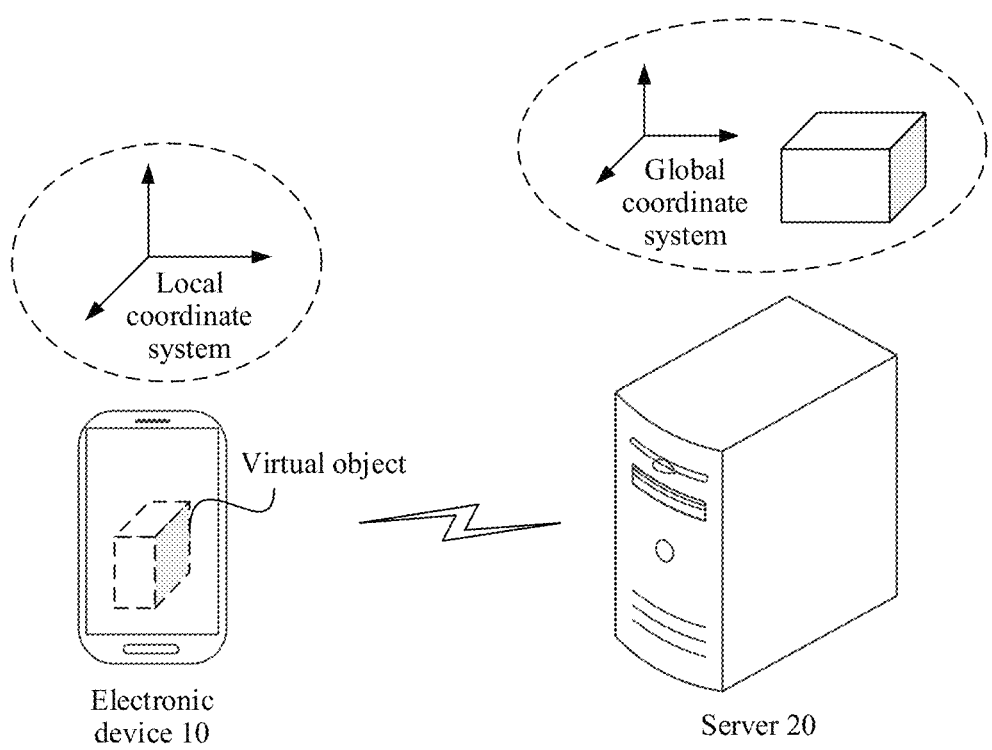
FIG. 1 is a schematic diagram of an application architecture according to an embodiment of this application.

Refer to FIG. 1. The application architecture provided in this embodiment of this application includes an electronic device 10 and a server 20. The electronic device 10 may communicate with the server 20. For example, the electronic device 10 may perform wireless fidelity Wi-Fi) communication, Bluetooth communication, or 2/3/4/5 generation (2/3/4/5 generation, 2G/3G/4G/5G) cellular communication with the server 20.

The electronic device 10 may be any type of device having a camera and a display component. For example, the electronic device 10 may be a terminal device such as a mobile phone, a tablet computer, a notebook computer, or a video recorder (an example in which the electronic device is a mobile phone is used in FIG. 1); may be a device used in virtual scenario interaction such as VR glasses, or an AR device, or an MR interaction device; may be a wearable electronic device such as a smartwatch or a smart band; or may be a vehicle-mounted device such as an unmanned vehicle or an uncrewed aerial vehicle. A specific form of the electronic device is not specifically limited in this embodiment of this application.

In addition, the electronic device 10 may alternatively be referred to as user equipment (UE), a subscriber station, a mobile unit, a subscriber unit, a wireless unit, a remote unit, a mobile device, a wireless device, a wireless communication device, a remote device, a mobile subscriber station, a terminal device, an access terminal, a mobile terminal, a wireless terminal, a smart terminal, a remote terminal, a handset, a user agent, a mobile client, a client, or another suitable name.

The server 20 may be one or more physical servers (FIG. 1 shows an example of one physical server), a computer cluster, a virtual machine in cloud computing, or the like.

In this embodiment of this application, a virtual scenario app such as a VR/AR/MR application may be installed on the electronic device 10, and the VR/AR/MR application may be run based on an operation (for example, tapping, touching, sliding, shaking, or voice activation) of a user. The electronic device may collect a video image of any object in an environment by using the local camera and/or a sensor, and display the virtual object on the display component based on the collected video image. The virtual object may be correspondingly a virtual object in a VR/AR/MR scenario (namely, an object in a virtual environment).

It should be noted that, in this embodiment of this application, the virtual scenario app on the electronic device 10 may be an application program built in the electronic device, or may be an application program from a third-party service provider installed by a user. This is not limited in this embodiment of this application.

In this embodiment of this application, a simultaneous localization and mapping (SLAM) system is further installed on the electronic device 10. The SLAM system can create a map in a completely unknown environment, and use the map for autonomous positioning, pose (location and posture) determining, navigation, and the like. In this specification, the map constructed by the SLAM system may be referred to as a SLAM map. The SLAM map may be understood as a map drawn by the SLAM system based on environment information collected by a collection device. The collection device may include, for example, an image collection apparatus (such as a camera or a lens) and an inertial measurement unit (IMU) in the electronic device. The IMU may include sensors such as a gyroscope and an accelerometer.

For example, the SLAM map may include: a plurality of key frames, feature points obtained through triangulation, and association between the key frames and the feature points. The key frames may be obtained based on images collected by the camera and a camera parameter (for example, a pose of the electronic device in a SLAM coordinate system) for generating the images. The feature points may represent different 3D map points in three-dimensional space in the SLAM map and feature descriptions about the 3D map points. Each of the feature points may have an associated feature location. Each of the feature points may represent a 3D coordinate location and is associated with one or more descriptors. The feature point may also be referred to as a 3D feature, a feature point, a 3D feature point, or another suitable name.

The 3D map point (or referred to as a three-dimensional map point) represents coordinates in axes X, Y, and Z in the three-dimensional space. For example, for a SLAM map in a local coordinate system, a 3D map point represents coordinates in axes X, Y, and Z in three-dimensional space of the local coordinate system. For a SLAM map in a global coordinate system, a 3D map point represents coordinates in axes X, Y, and Z in three-dimensional space of the global coordinate system.

A coordinate system used for constructing the SLAM map may be referred to as a first coordinate system. In some application scenarios, the first coordinate system in this specification may also be referred to as a local coordinate system, a SLAM coordinate system, a camera coordinate system, or another suitable name. For ease of understanding, the name "local coordinate system" is mainly used for description in the following description of this solution. Correspondingly, a pose of the electronic device presented in the local coordinate system may be referred to as a local pose.

In this embodiment of this application, the server 20 may serve as a platform for providing content and information support for the VR/AR/MR application on the electronic device 10. The server 20 also stores a map, and the map may be briefly referred to as a global map in this specification. Generally, compared with a SLAM map in a single electronic device, the global map includes a larger area and is higher-definition map, and is maintained and updated by the server. In an implementation, the global map may be pre-constructed offline on the server. In another implementation, the global map may be obtained by incorporating, according to a specific rule, a plurality of SLAM maps collected by one or more electronic devices.

A coordinate system used for constructing the global map may be referred to as a second coordinate system. In some application scenarios, the second coordinate system in this specification may also be referred to as a global coordinate system, a world coordinate system, or another suitable name. For ease of understanding, the name "global coordinate system" is mainly used in the following description of this solution. Correspondingly, a pose of the electronic device presented in the global coordinate system may be referred to as a global pose.

Figure 2:
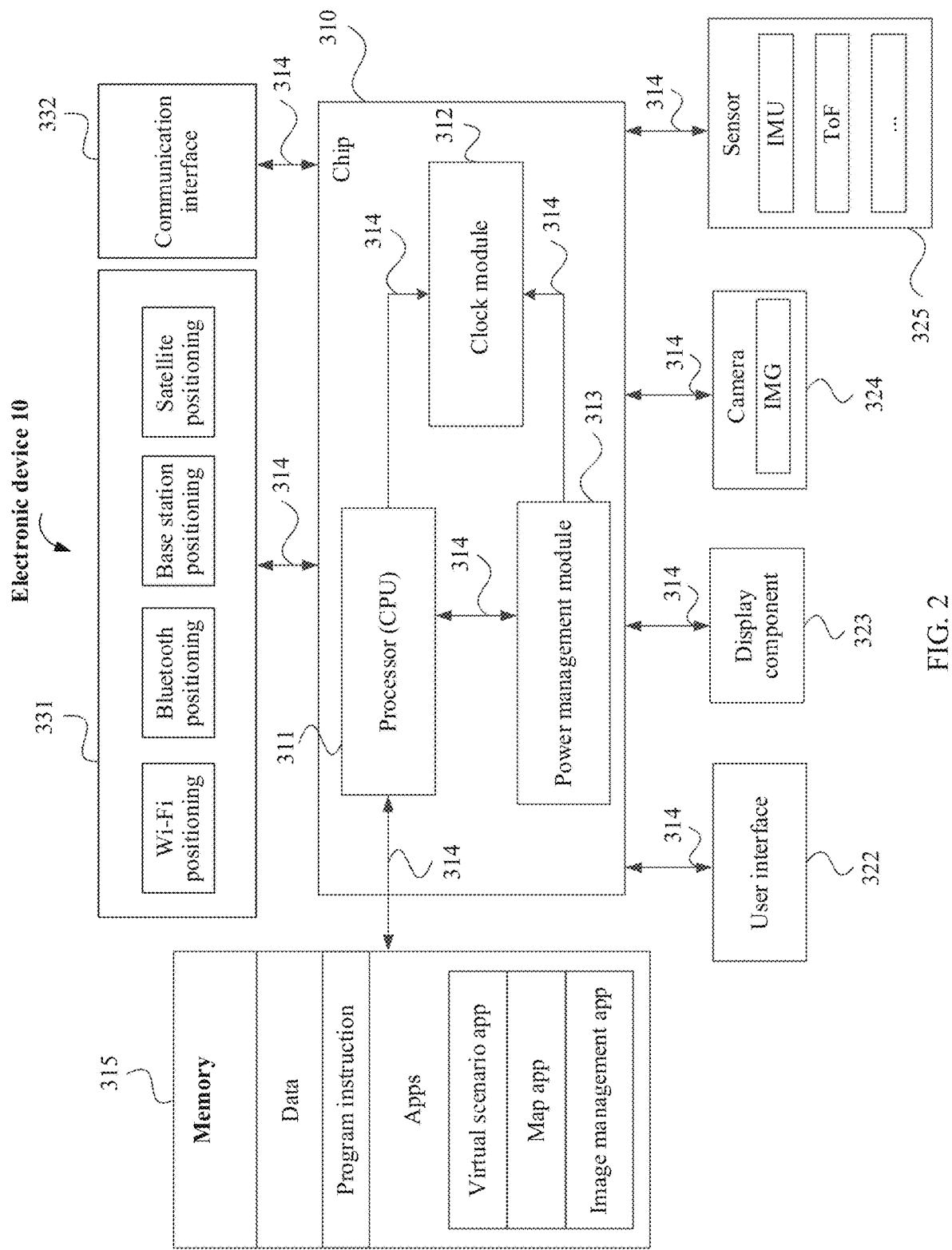
FIG. 2 is a schematic diagram depicting a structure of an electronic device according to an embodiment of this application.

FIG. 2 is a schematic diagram depicting an example structure of the electronic device 10. It can be understood that the structure described in this embodiment of this application does not constitute any limitation on the electronic device 10. In some other embodiments of this application, the electronic device 10 may include more or fewer components than those shown in the figure, or some components may be combined, or some components may be split, or different component arrangements may be used. Various components shown in the figure may be implemented in hardware that includes one or more signal processors and/or application-specific integrated circuits, software, or a combination of hardware and software.

As shown in FIG. 2, the electronic device 10 may include a chip 310, a memory 315 (one or more computer-readable storage media), a user interface 322, a display component 323, a camera 324, a positioning module 331, and a transceiver 332. These components may perform communication through one or more communication buses 314.

The chip 310 may integrate one or more processors 311, a clock module 312, and a power management module 313. The clock module 312 integrated into the chip 310 is mainly configured to provide, for the processor 311, a timer required for data transmission and sequential control, and the timer may implement clock functions of data transmission and sequential control. Based on instruction operation code and timing signals, the processor 311 may perform operations, generate operation control signals, and control instruction fetching and instruction execution. The power management module 313 integrated into the chip 310 is mainly configured to provide a stable and high-precision voltage for the chip 310 and other components of the electronic device 10.

The processor 310 may also be referred to as a central processing unit (CPU). The processor 110 may specifically include one or more processing units. For example, the processor 110 may include an application processor (AP), a modem processor, and a graphics processing unit (GPU), an image signal processor (ISP), a controller, a video codec, a digital signal processor (DSP), a baseband processor, and/or a neural-network processing unit (NPU), and the like. Different processing units may be standalone devices, or may be integrated into one or more processors.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identification module (SIM) interface, a universal serial bus (USB) port, and/or the like.

The memory 315 may be connected to the processor 311 through a bus, or may be coupled to the processor 311. The memory 315 is configured to store various software programs and/or a plurality of groups of instructions. During specific implementation, the memory 315 may include a high-speed random access memory (for example, a cache), or may include a nonvolatile memory, for example, one or more magnetic disk storage devices, a flash memory, or another nonvolatile solid-state storage device. The memory 315 may store an operating system such as Android, iOS, Windows, Linux, or another embedded operating system. The memory 315 is further configured to store a program related to the SLAM system. The memory 315 is configured to store data (for example, image data, point cloud data, map data, key frame data, pose data, and coordinate system conversion information). The memory 315 may further store a communication program, where the communication program may be used to communicate with one or more servers or another device. The memory 315 may further store one or more apps. As shown in the figure, these apps may include: an AR/VR/MR virtual scenario app, a map app, and an image management app. The memory 115 may further store a user interface program, and the user interface program may intuitively display content (such as virtual objects in a virtual AR/VR/MR scenario) of an application through a graphical operation interface, and present the content by using the display component 323, and receive, by using input controls such as a menu, a dialog box, and a key, control operations performed by a user on the application. The memory 315 may be configured to store computer-executable program code of a computer, where the executable program code includes instructions.

The user interface 322 may be, for example, a touch panel, and the touch panel detects an operation instruction of the user delivered to the detection touch panel. The user interface 322 may be alternatively a keypad, a physical button, or a mouse.

The electronic device 10 may include one or more display components 323. The electronic device 10 may implement a display function jointly by using the display component 323, and the graphics processing unit (GPU) and the application processor (AP) in the chip 310. The GPU is a microprocessor for image processing, and is connected to the display component 323 and the application processor. The GPU is configured to perform mathematical and geometric calculation for image rendering. The display component 323 is configured to display interface content currently output by the system, for example, display images or videos in the AR/VR/MR virtual scenario. The interface content may include an interface of a running application, a system-level menu, and the like. The interface content may specifically include the following interface elements: input interface elements such as a button, a text input box (Text), a scroll bar, and a menu; and output interface elements such as a window, a label, an image, a video, and an animation.

During specific implementation, the display component 323 may be a display panel, lenses (for example, VR glasses), a projection screen, or the like. The display panel may also be referred to as a display screen. For example, the display panel may be a touchscreen, a flexible screen, a curved screen, or another optical component. To be specific, in this application, when the electronic device has a display screen, the display screen may be a touchscreen, a flexible screen, a curved screen, or a screen in another form. The display screen of the electronic device has a function of displaying images. A specific material and shape of the display screen are not limited in this application.

For example, when the display component 323 includes a display panel, the display panel may be a liquid crystal display (LCD), an organic light-emitting diode (OLED), an active-matrix organic light emitting diode (AMOLED), a flexible light-emitting diode (FLED), a Mini Led, a Micro Led, or a Micro oLed, quantum dot light emitting diodes (QLED). In addition, in some specific implementation, the touch panel in the user interface 322 and the display panel in the display component 323 may be coupled for disposing. For example, the touch panel may be disposed below the display panel. The touch panel may be configured to detect touch pressure acting on the display panel when a user performs a touch operation (for example, tapping, sliding, or touching) on the display panel. The display panel is configured to display content.

The camera 324 may be a monocular camera, a binocular camera, or a depth camera, and is configured to photograph/record an environment to obtain images/video images. The images/video images collected by the camera 324 may be used as input data of the SLAM system, for example, may be displayed by using the display component 323.

In some scenarios, the camera 324 may alternatively be considered as a sensor. An image collected by the camera 324 may be an image in an IMG format or another format. This is not limited herein.

The sensor 325 may be configured to collect data related to status changes (for example, rotation, swinging, movement, or shaking) of the electronic device 10. Data collected by the sensor 325 may be used as, for example, input data of the SLAM system. The sensor 325 may include one or more sensors, for example, an inertial measurement unit (IMU) and a time of flight (ToF) sensor. The IMU may further include sensors such as a gyroscope and an accelerometer. The gyroscope may be configured to measure an angular velocity generated when the electronic device moves, and the accelerometer is configured to measure an acceleration generated when the electronic device moves. The ToF sensor may further include a light emitter and an optical receiver. The light emitter may be configured to emit light outwards, such as laser light, infrared rays, and radar waves. The optical receiver may be configured to detect reflected light such as reflected laser light, infrared rays, and radar waves.

It should be noted that the sensor 325 may further include more other sensors such as an inertial sensor, a barometer, a magnetometer, and a wheel speedometer.

The positioning module 331 is configured to physically locate the electronic device 10, for example, obtain an initial location of the electronic device 10. The positioning module 331 may include, for example, one or more of a Wi-Fi positioning module, a Bluetooth positioning module, a base station positioning module, and a satellite positioning module. A global navigation satellite system (GNSS) may be installed in the satellite positioning module for auxiliary positioning. The GNSS is not limited to a BeiDou system, a GPS system, a GLONASS system, and a Galileo system.

The transceiver 332 is configured to implement communication between the electronic device 10 and a server or another terminal device. The transceiver 332 integrates a transmitter and a receiver, configured to send a radio frequency signal and receive a radio frequency signal. During specific implementation, the transceiver 332 may include but is not limited to an antenna system, an RF transceiver, one or more amplifiers, a tuner, one or more oscillators, a digital signal processor, a CODEC chip, a SIM card, a storage medium, and the like. In some embodiments, the transceiver 332 may alternatively be implemented on an individual chip. The transceiver 332 may support, for example, communication by using at least one of 2G, 3G, 4G, and 5G data networks; and/or support at least one of the following short-range wireless communication modes: Bluetooth (BT) communication, wireless fidelity (Wi-Fi) communication, near field communication (NFC), infrared (IR) wireless communication, ultra-wideband (UWB) communication, and ZigBee communication.

In this embodiment of this application, the processor 311 executes various functional applications and data processing functions of the electronic device 10 by running instructions stored in the memory 315. Specifically, the processor 311 may perform the method steps described in the embodiment in FIG. 7, or may perform functions on the electronic device side in the embodiment in FIG. 11, FIG. 12, or FIG. 15.

Figure 3:
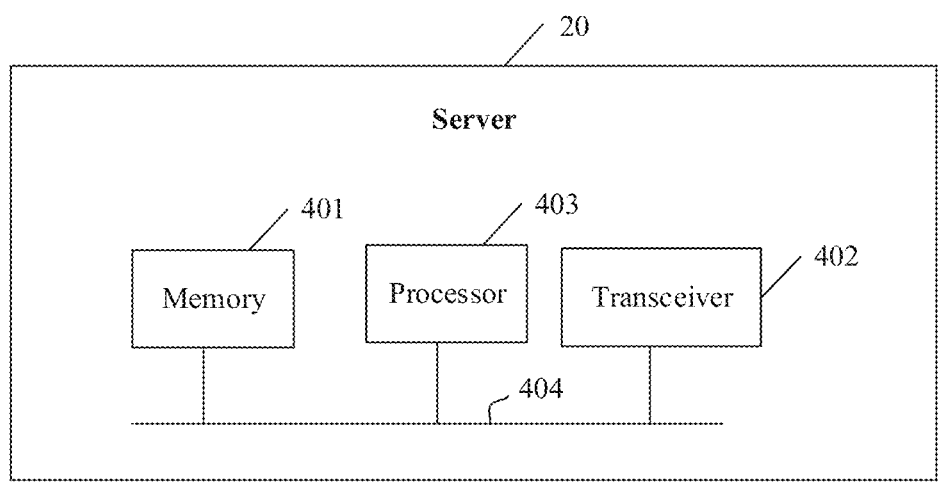
FIG. 3 is a schematic diagram depicting a structure of a server according to an embodiment of this application.

FIG. 3 is a block diagram depicting a structure of an implementation of a server 20 according to an embodiment of this application. As shown in FIG. 3, the server 20 includes a processor 403, a memory 401 (one or more computer-readable storage media), and a transceiver 402. These components may perform communication through one or more communication buses 404.

The processor 403 may be one or more central processing units (CPU). When the processor 403 is one CPU, the CPU may be a single-core CPU or a multi-core CPU.

The memory 401 may be connected to the processor 403 through a bus, or may be coupled to the processor 403. The memory 401 is configured to store various software programs and/or a plurality of groups of instructions, and data (for example, map data and pose data). During specific implementation, the memory 401 includes but is not limited to a random access memory (RAM), a read-only memory (ROM), an erasable programmable read-only memory (EPROM), or a portable read-only memory (CD-ROM).

The transceiver 402 mainly integrates a receiver and a transmitter. The receiver is configured to receive data (for example, requests or images) sent by an electronic device, and the transmitter is configured to send data (for example, map data or pose data) to the electronic device.

It should be understood that the server 20 is merely an example in this embodiment of this application. During specific implementation, the server 20 may have more components than those shown in the figure.

Figure 11:
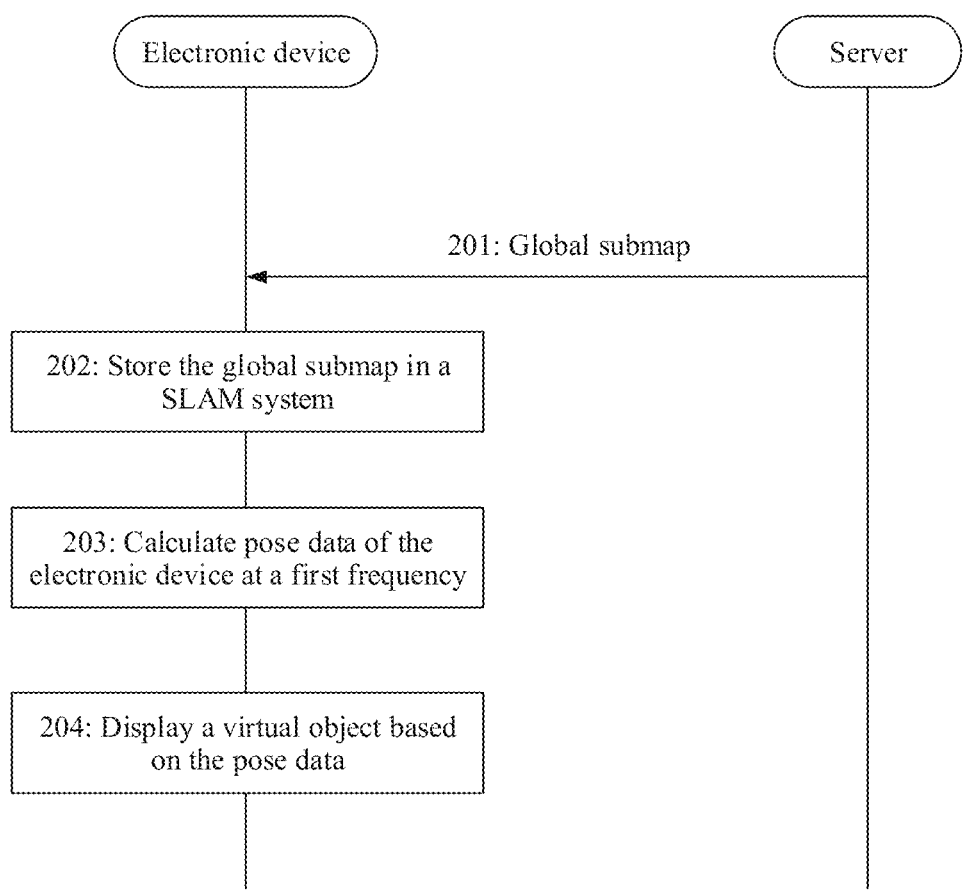
FIG. 11 is a schematic flowchart of another method for displaying a virtual object according to an embodiment of this application.
Figure 12:
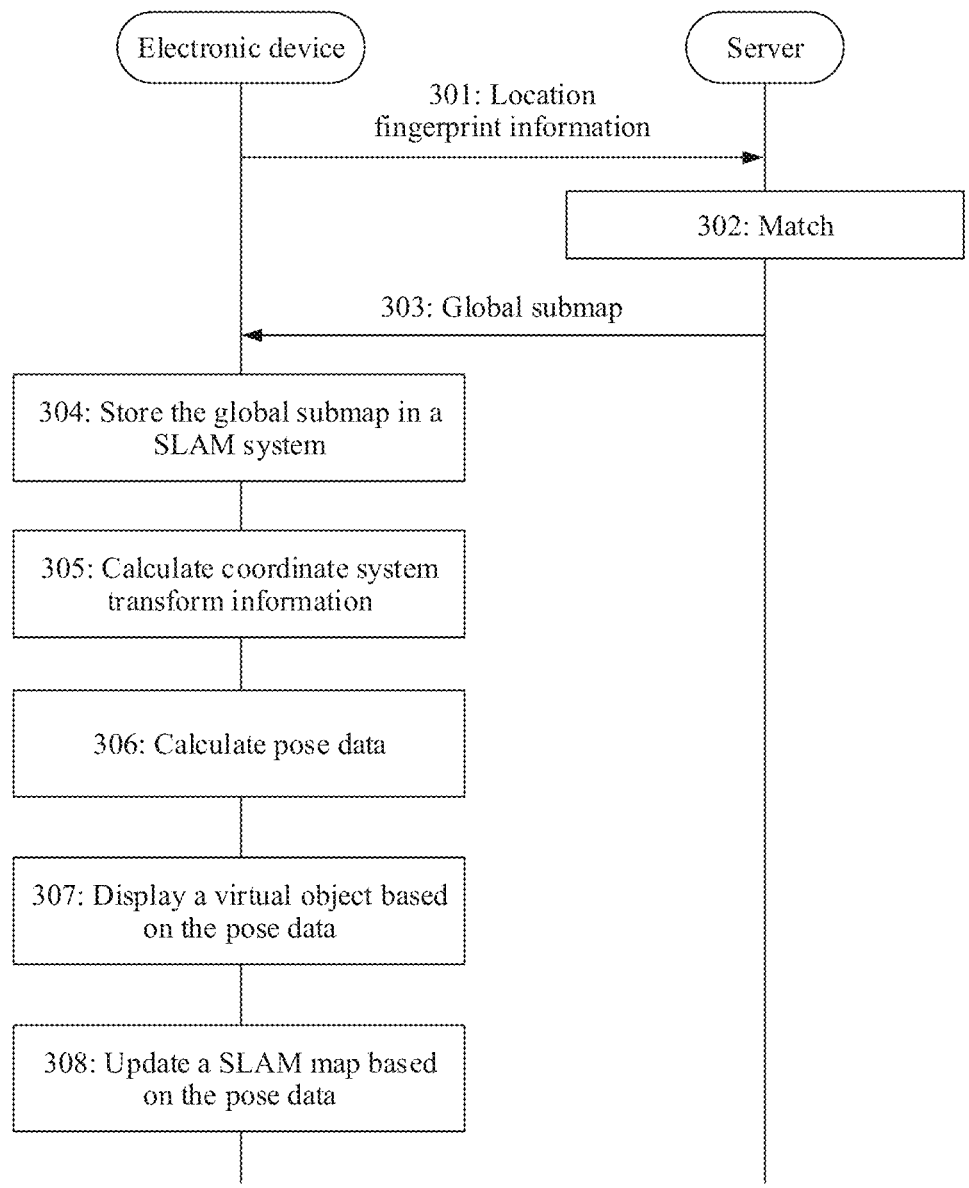
FIG. 12 is a schematic flowchart of another method for displaying a virtual object according to an embodiment of this application.
Figure 15:
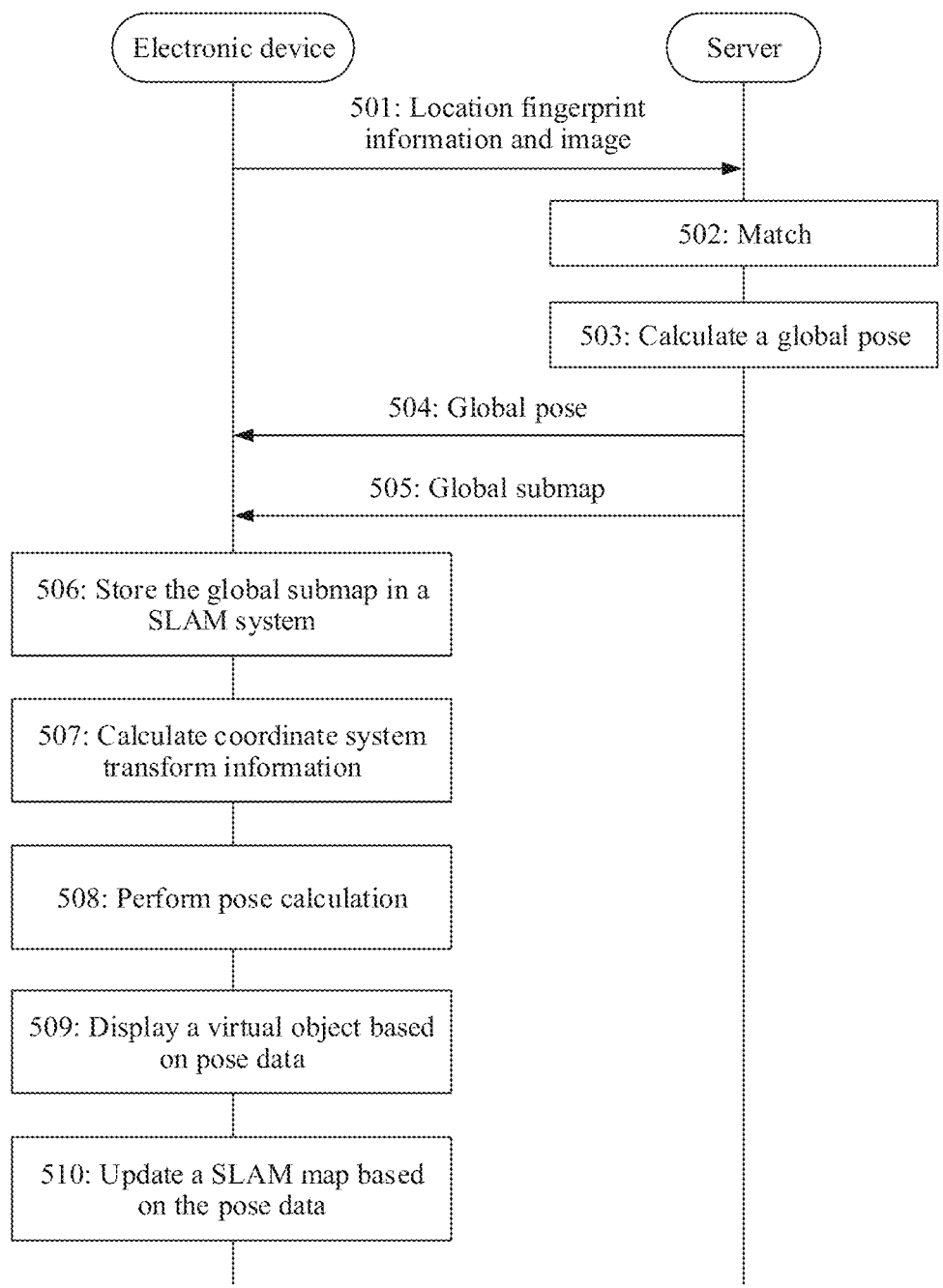
FIG. 15 is a schematic flowchart of another method for displaying a virtual object according to an embodiment of this application.

In a specific embodiment of this application, the processor 403 may be configured to call program instructions in the memory 401, to perform functions on a server side in the embodiment in FIG. 11, FIG. 12, or FIG. 15.

As used herein, the term "coupled" means a direct connection, or a connection implemented by using one or more intermediate components or circuits. Any signal provided on any bus described herein may be time multiplexed with other signals, and provided on one or more shared buses. In addition, interconnections between circuit elements or software blocks may be shown as buses or single signal cables. Each bus may alternatively be a single signal cable, each single signal cable may alternatively be a bus, and the single cable or bus may represent any one or more of a large quantity of physical or logical mechanisms for communication between components.

In an AR/VR/MR virtual scenario, a location/posture of a virtual object presented on the display component of the electronic device in real time is closely related to a location/posture of the electronic device. In other words, pose data of the electronic device determines a form, a size, content, and the like of the presented virtual object. Therefore, the pose of the electronic device needs to be tracked. In an existing pose tracking solution, a SLAM system performs feature extraction on an input image, obtains an estimated pose based on a constructed SLAM map, then processes information such as an acceleration and an angular velocity collected by an IMU to obtain another estimated pose, and finally integrates the two estimated poses according to an algorithm to obtain a final pose of the electronic device. However, because an error exists in each estimated pose, errors are iteratively accumulated over a pose tracking process. Therefore, a drift phenomenon in the pose (a local pose) of the electronic device in a local coordinate system occurs over long-time (for example, 1 minute) running of the SLAM system, resulting great deviations in the location and a direction of the virtual object displayed on the electronic device.

To rectify the drift phenomenon, in an existing solution, the electronic device transmits a current image to the server; the server calculates a pose of the electronic device in a global coordinate system based on the current image and transmits the pose to the electronic device (where there is a delay of, for example, 2 seconds). The electronic device calculates and updates a coordinate transform matrix between the global coordinate system and the local coordinate system. Because pose drift already exists in the SLAM system, there is a significant difference between a value of the currently calculated coordinate system transform matrix and a value of a previously calculated coordinate system transform matrix. Therefore, when the SLAM system uses the currently calculated coordinate system transform matrix to update the local pose, significant changes may occur in the local pose, causing pose jumping on the presented virtual object.

Figure 4:
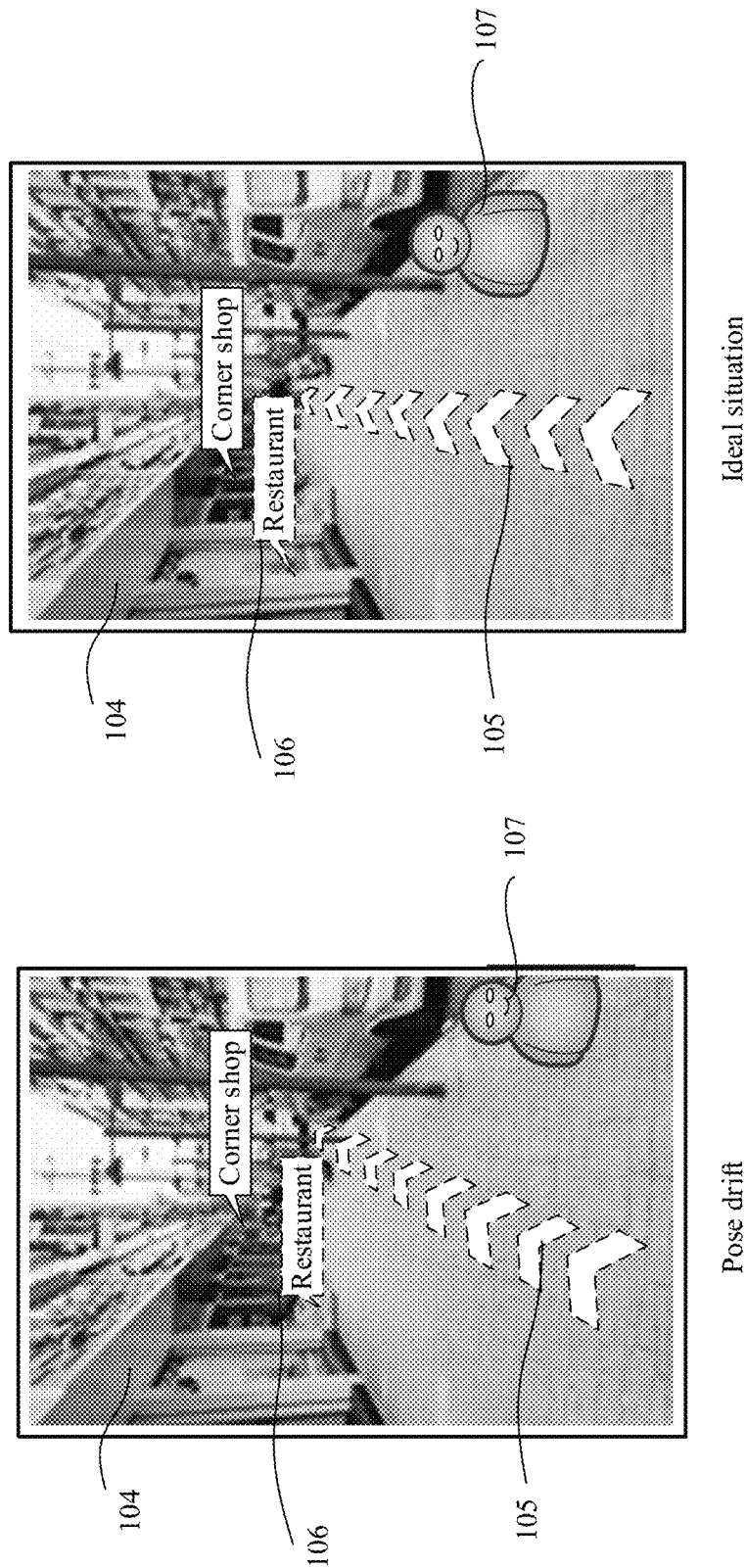
FIG. 4 is a diagram of comparison between a situation in which pose drift occurs and an ideal situation in an AR scenario.

For ease of understanding, for example, FIG. 4 shows a comparison between a situation in which pose shift occurs and an ideal situation in an AR scenario. In the figure, 104 represents a real image in an environment; and a navigation indication 105, a storefront indication 106, and an interactive robot 107 all are virtual objects generated by using graphics and visualization technologies. Based on a current pose of the electronic device, poses and postures of the virtual objects in a screen may be calculated, so that the virtual objects are fused with a real environment image, to present real sensory experience to users. It may be learned through comparison between the two situations in FIG. 4 that deviations may occur on these virtual objects in the screen when the pose drift phenomenon occurs in the SLAM system, causing distortion of fusion between the virtual objects and the real environment image, and greatly affecting user experience. When the SLAM system rectifies the drift phenomenon, the virtual objects in the screen jumping from the deviation state to a normal ideal state. Therefore, users may see the phenomenon that "virtual objects jump", and user experience deteriorates.

Figure 5:
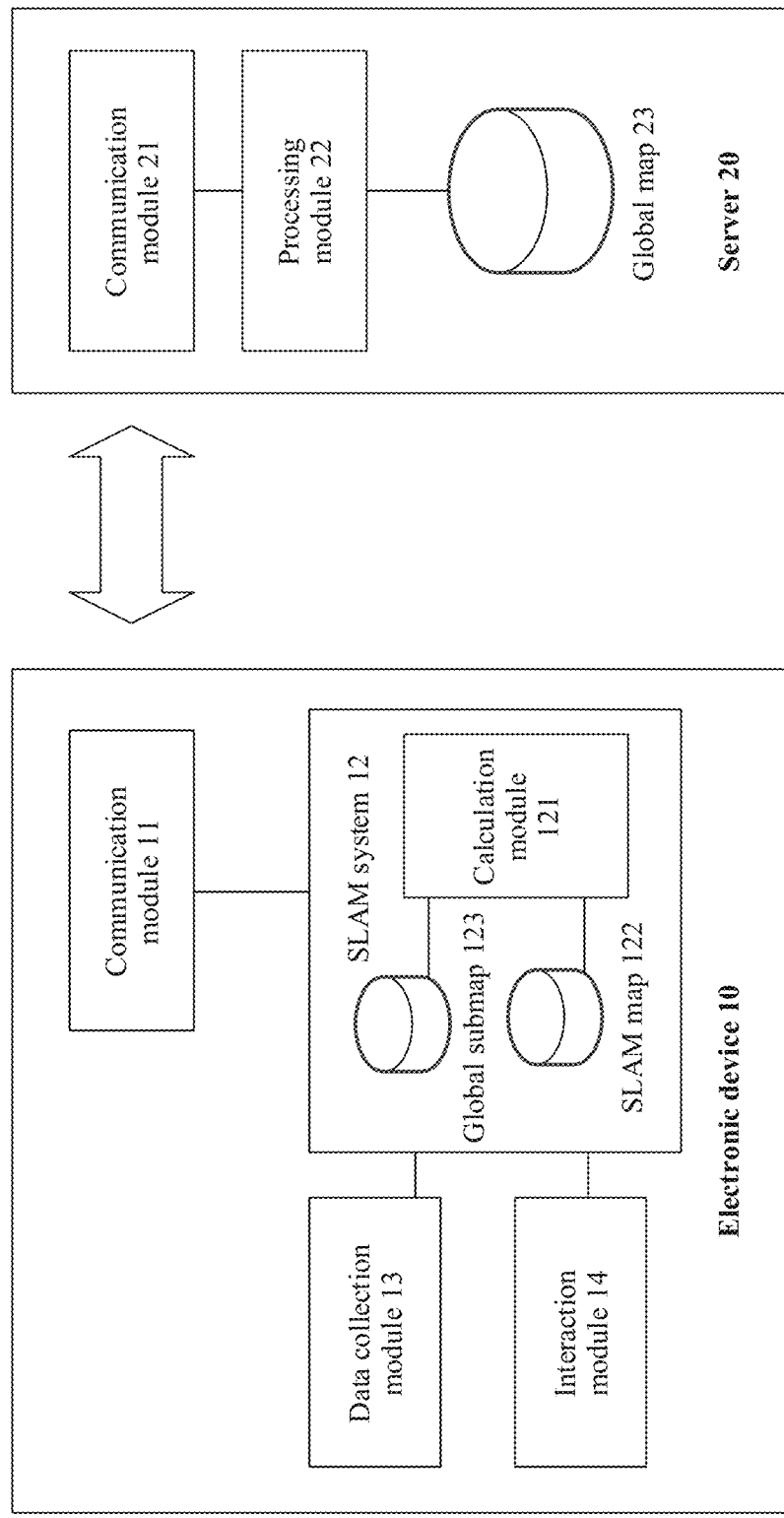
FIG. 5 is a schematic diagram depicting a structure of a system and an electronic device and a server in the system according to an embodiment of this application.

FIG. 5 is a block diagram depicting a structure of a system according to an embodiment of this application. The system includes an electronic device 10 and a server 20. The electronic device 10 and the server 20 may implement communication connections to each other by using respective transceivers. In this embodiment of this application, a SLAM system 12, a data collection module 13, an interaction module 14, and a communication module 11 are configured in the electronic device 10, to reduce or eliminate drift and jumping phenomena occurring in a pose of the electronic device 10 and implement highly accurate pose tracking. The SLAM system 12, the data collection module 13, the interaction module 14, and the communication module 11 may exist in a form of software code. In a specific implementation, data/programs of these functional modules may be stored in the memory 315 shown in FIG. 2, and may be run on the processor 311 shown in FIG. 2.

The communication module 11 may implement communication with the server 20 by using the transceiver 332 shown in FIG. 2. Specifically, the communication module 11 is configured to obtain a global submap from the server 20, where the global submap is a submap in a global map stored by the server 20, and corresponds to location information of the electronic device 10. The communication module 11 also stores the global submap into a database 123 of the global submap in the SLAM system 12 of the electronic device 10.

The data collection module 13 is configured to: obtain status data of the electronic device 10 by using the sensor 325 shown in FIG. 2, obtain a video image by using the camera 324 shown in FIG. 2, and obtain a location of the electronic device by using the positioning module 331 shown in FIG. 2.

The interaction module 14 is configured to: detect a user operation by using the user interface 322 shown in FIG. 2, and display an image/video/virtual object by using the display component 323 shown in FIG. 2, for example, content of an AR/VR/MR application.

The calculation module 121 in the SLAM system 12 is configured to perform pose calculation based on a video image collected by the camera 324 and the downloaded global submap, to obtain pose data of the electronic device 10. The interaction module 14 may display the virtual object on the display component based on the pose data of the electronic device 10.

A SLAM map constructed by the SLAM system 12 is stored in a database 122 of the SLAM map, and the SLAM system is further configured to update the SLAM map in the database 122 based on the pose data of the electronic device 10.

Figure 7:
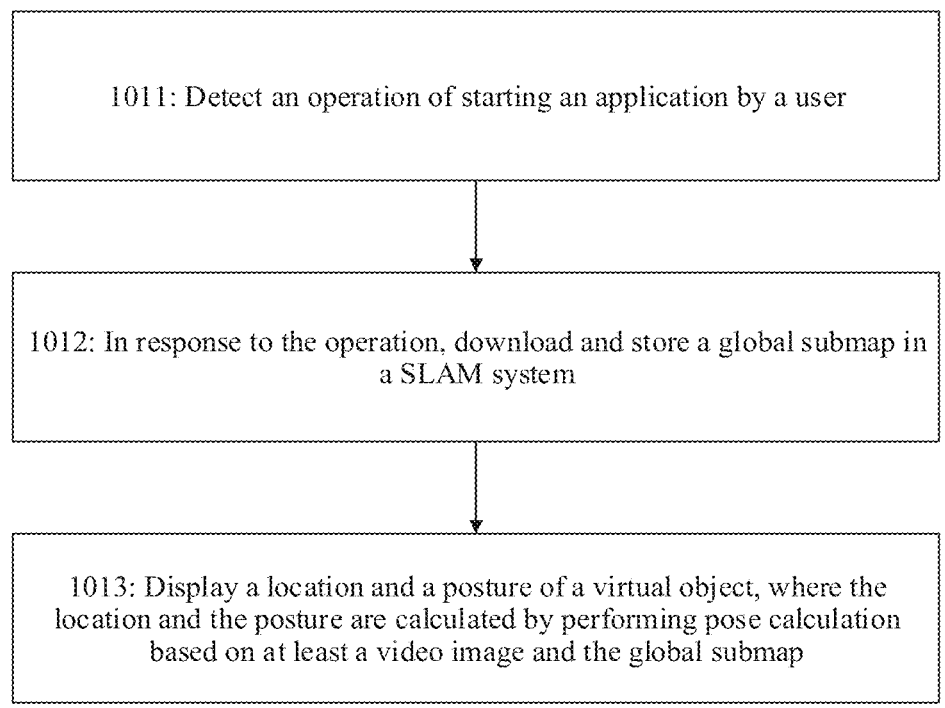
FIG. 7 is a schematic flowchart of a method for displaying a virtual object according to an embodiment of this application.

In a specific embodiment, the functional modules in the electronic device 10 may collaborate with each other, to perform steps of a method in an embodiment shown in FIG. 7, or execute functions on an electronic device side in an embodiment shown in FIG. 11, FIG. 12, or FIG. 15.

A communication module 21, a processing module 22, and a database 23 of a global map are configured in the server 20. The communication module 21, the processing module 22, and the database 23 of the global map may exist in a form of software code. In a specific implementation, data/programs of these functional modules may be stored in the memory 401 shown in FIG. 3, and run in the processor 403 shown in FIG. 3.

The database 23 of the global map is configured to store, maintain, and update the global map.

The processing module 22 may be configured to obtain, based on the location information of the electronic device 10 from the global map stored in the database 23, a submap corresponding to the location information of the electronic device 10, that is, the global submap.

The communication module 21 may communicate with the electronic device 10 by using the transceiver 402 shown in FIG. 3. Specifically, the communication module 21 may send the global submap to the electronic device 10.

In a specific embodiment, the functional modules in the server 20 may collaborate with each other to execute functions on the server side in the embodiment shown in FIG. 11, FIG. 12, or FIG. 15.

Figure 6:
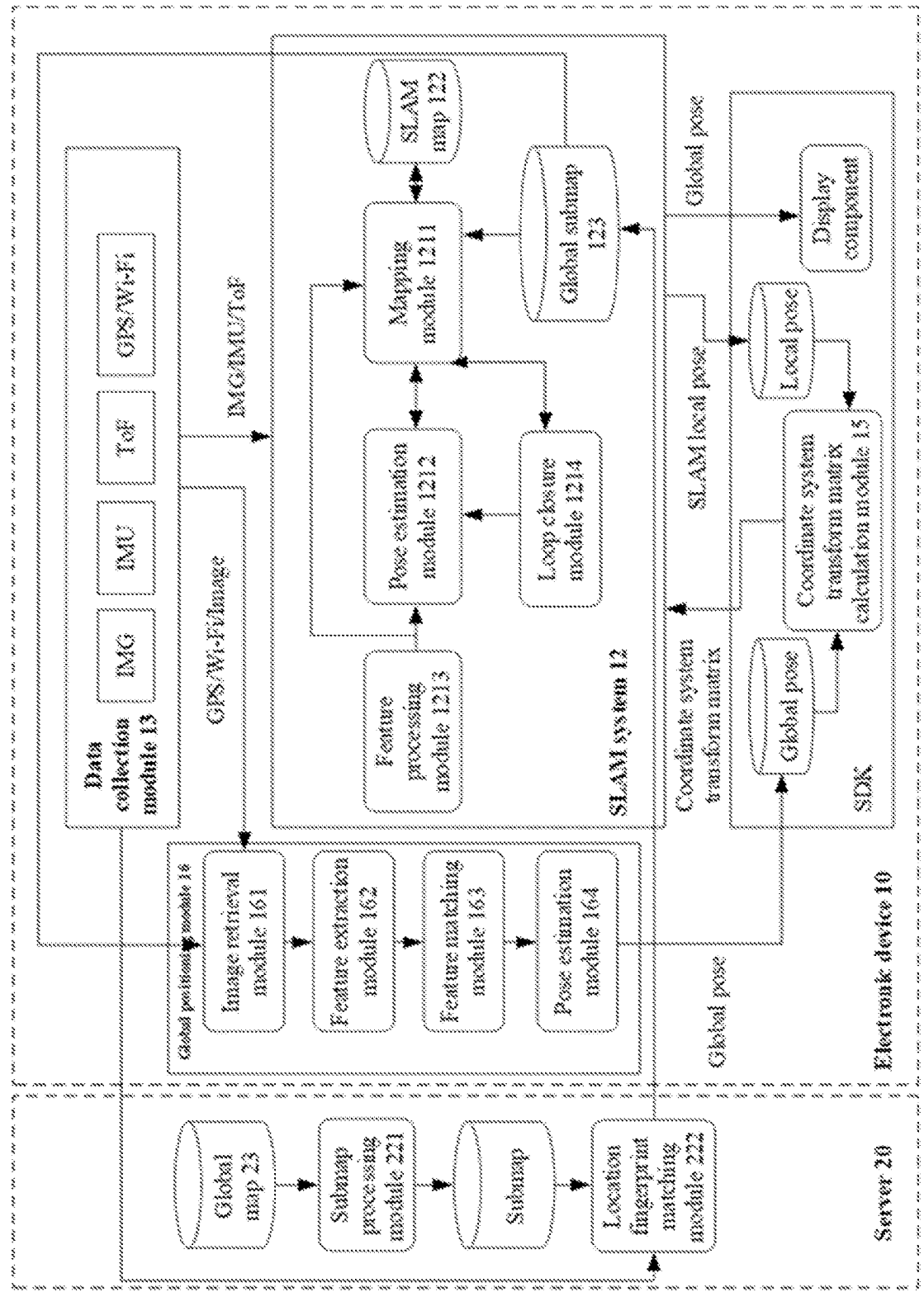
FIG. 6 is a schematic diagram depicting a structure of another system and an electronic device and a server in the system according to an embodiment of this application.

FIG. 6 shows components (or referred to as submodules) potentially included in the functional modules of the electronic device 10 shown in FIG. 5, and components (or referred to as submodules) potentially included in the functional modules of the server 20 in a specific implementation. It should be noted that the components (or referred to as submodules) potentially included in the functional modules of the electronic device 10 (for example, the SLAM system, the data collection module 13, the interaction module 14) and the components (or referred to as submodules) potentially included in the functional modules (for example, the processing module 22) of the server 20 are merely examples of this embodiment of this application. In other embodiments, the foregoing functional modules may further include more or fewer components (or referred to as submodules).

As shown in FIG. 6, the calculation module 121 in the SLAM system 12 further includes a mapping module 1211, a pose estimation module 1212, a feature processing module 1213, and a loop closure module. In addition, the electronic device 10 further includes a global localization module 16 and a software development kit (SDK). The global localization module 16 further includes an image retrieval module 161, a feature extraction module 162, a feature matching module 163, and a pose estimation module 164. The SDK may include a database used for a global pose, a database used for a local pose, and a coordinate system transform matrix calculation module 15. The SDK may further call the interaction module 14 to implement displaying by using the display component.

The feature processing module 1213 may be configured to perform operations related to visual feature processing. For example, in an embodiment, the feature processing module 1213 may further include a feature extraction module (not shown in the figure) and a feature matching module (not shown in the figure). The feature extraction module has a feature detection function and a feature description function. The feature detection function is used to extract an image location of a feature from an image. The feature description function is used to describe each detected feature to form a one-dimensional vector, which is used in feature matching performed by the feature matching module.

The data collection module 13 (for example, an IMU sensor) can output an angular velocity and a linear acceleration at a high frequency. The pose estimation module 1212 separately performs an integral operation on the angular acceleration and the linear acceleration, performs pose estimation based on the video image photographed by the camera, to calculate a location and a posture of the electronic device. A pose estimation result may be used as an output of the SLAM system. In addition, the pose estimation result may also be used as an input of the mapping module 1211. The mapping module 1211 creates, in a local coordinate system, an environment map that can be sensed by the SLAM system, namely, the SLAM map. The SLAM system constantly creates/updates the SLAM map while running in space. When the SLAM system returns to a scenario in which the SLAM system runs before, the loop closure module 1214 may be configured to reduce errors accumulated to the SLAM map. In some embodiments, the SLAM map may also be used as a pose estimation input of the pose estimation module 1212, to improve accuracy of pose estimation.

In an embodiment, the global submap downloaded from the server 20 is stored in the database 123. The pose estimation module 1212 is configured to perform pose calculation based on the global submap, the video image collected by the camera 324, and motion data collected by the sensor 325, to obtain the pose data of the electronic device 10, that is, obtain a global pose of the electronic device 10. In this way, pose tracking and positioning of the electronic device 10 are implemented. The motion data includes motion speed data and motion direction data of the electronic device 10, for example, an acceleration and an angular velocity. Specifically, the feature processing module 1213 may be configured to extract a 2D feature of the video image. The pose estimation module 1212 may obtain the global pose of the electronic device 10 in the global submap based on the 2D feature of the video image, a 3D map point of the global submap, and the motion data collected by the data collection module 13 (for example, the IMU).

In an embodiment, the pose estimation module 1212 is configured to track the global pose of the electronic device 10 at a high first frequency, where the first frequency is a frequency at which the SLAM system performs global pose estimation, that is, a frequency at which the SLAM system calls the global submap in the database 123. The first frequency may be numerically less than or equal to a frequency at which the display component displays a video stream. For example, the first frequency is 30 frames per second. Certainly, this is merely an explanation rather than a limitation. That is, the pose estimation module 1212 may call the global submap at a high fixed frequency to implement pose tracking on the electronic device 10. In this way, after the global pose of the electronic device 10 is obtained in real time, the location and the posture of the virtual object in an AR/VR/MR virtual scenario can be displayed on the display component based on the global pose of the electronic device 10.

The pose estimation module 1212 of the SLAM system may also be configured to determine a local pose (the local pose herein may be referred to as first pose data) of the electronic device 10 in the SLAM map in the local coordinate system based on the $K^{th}$ frame of image in a video image sequence collected by the camera and the SLAM map in the local coordinate system. K is an integer greater than or equal to 1. Specifically, the feature processing module 1213 may be configured to extract a 2D feature in the $K^{th}$ frame of image. The pose estimation module 1212 may obtain first pose data of the electronic device 10 in the SLAM map in the local coordinate system based on a 2D feature in the $K^{th}$ frame of image, a 3D map point of the SLAM map in the local coordinate system, and motion data collected by the data collection module 13 (for example, the IMU). The motion data includes motion speed data and motion direction data of the electronic device 10, for example, an acceleration and an angular velocity.

The global pose module 16 is configured to determine, at an initial moment or at any following moment, a global pose (the global pose herein may be referred to as second pose data) of the electronic device 10 in the global submap based on the $K^{th}$ frame of image in the collected video image and the global submap. K is an integer greater than or equal to 1. Specifically, the image retrieval module 161 may obtain the $K^{th}$ frame of image in the video image sequence; the feature extraction module 162 performs feature extraction based on the Kth frame of image, to obtain an image feature; the feature matching module 163 performs feature matching on the image feature in the global submap to obtain a map feature that matches the image feature; and the pose estimation module 164 calculates the second pose data of the electronic device 10 in the global submap based on the image feature and the map feature.

The first pose data (the local pose) and the second pose data (the global pose) each may be stored in an individual database in the SDK. The coordinate system transform matrix calculation module 15 may be configured to calculate coordinate system transform information (for example, a coordinate system transform matrix) between the local coordinate system of the SLAM map and the global coordinate system of the global map based on the first pose data and the second pose data. The coordinate system transform matrix calculation module 15 feeds back the coordinate system transform information to the SLAM system.

The mapping module 1211 in the SLAM system may be configured to update the SLAM map in the database 122 of the SLAM system based on the pose data of the electronic device 10. Specifically, the mapping module 1211 may transform the SLAM map into a map in the global coordinate system based on the coordinate system transform information, and update the SLAM map in the global coordinate system by using the global pose of the electronic device 10 as pose data of the electronic device in the SLAM map in the global coordinate system.

In a specific embodiment, the functional modules in the electronic device 10 may collaborate with each other, to perform the steps of the method in the embodiment shown in FIG. 7, or execute functions on the electronic device side in the embodiment shown in FIG. 11 and FIG. 12.

In an embodiment, the processing module 22 in the server 20 further includes a submap processing module 221 and a location fingerprint matching module 222. The location fingerprint matching module 222 is configured to search the global map based on location fingerprint information (which may be referred to as first location fingerprint information herein) of an initial location sent by the electronic device 10 for location fingerprint information (which may be referred to as second location fingerprint information herein) that matches the first location fingerprint information. The submap processing module 221 is configured to extract, from the global map of the database 23, the global submap including the second location fingerprint information. The global submap may also be additionally stored in a database of the server 20 for quick subsequent access. The server 20 may send the global submap including the second location fingerprint information to the electronic device 10.

In a specific embodiment, the functional modules in the server 20 may collaborate with each other to execute functions on the server side in the embodiment shown in FIG. 11 or FIG. 12.

Based on the foregoing description, the following provides some method for displaying a virtual object provided in embodiments of this application. For ease of description, the method embodiments described below are expressed as a combination of a series of action steps. However, a person skilled in the art should understand that specific implementations of the technical solutions of this application are not limited to a sequence of the described series of action steps.

FIG. 7 is a schematic flowchart of a method for displaying a virtual object according to an embodiment of this application. In some implementations, the method may be applied to an electronic device having a display component and a camera. The method includes but is not limited to the following steps.

S1011: Detect an operation of starting an application by a user.

S1012: In response to the operation, download a global submap and store the global submap in a SLAM system of the electronic device, where the global submap is a submap corresponding to a location of the electronic device in the global map.

S1013: Display a location and a posture of the virtual object on the display component, where the location and the posture of the virtual object are calculated by performing pose calculation based on at least a video image collected by the camera and the global submap.

In this embodiment of this application, the user inputs, into the electronic device, the operation of starting the application (APP), for example, a tapping, touching, sliding, shaking, or voice activation operation. In response to the operation, an interface of the application is displayed on the display component (for example, a display panel or a lens) of the electronic device. In addition, a process of downloading the global submap from a server or another device (for example, another terminal device or storage medium such as a hard disk or a USB) is started. The application may be an AR/VR/MR application installed on the electronic device.

Figure 8A:
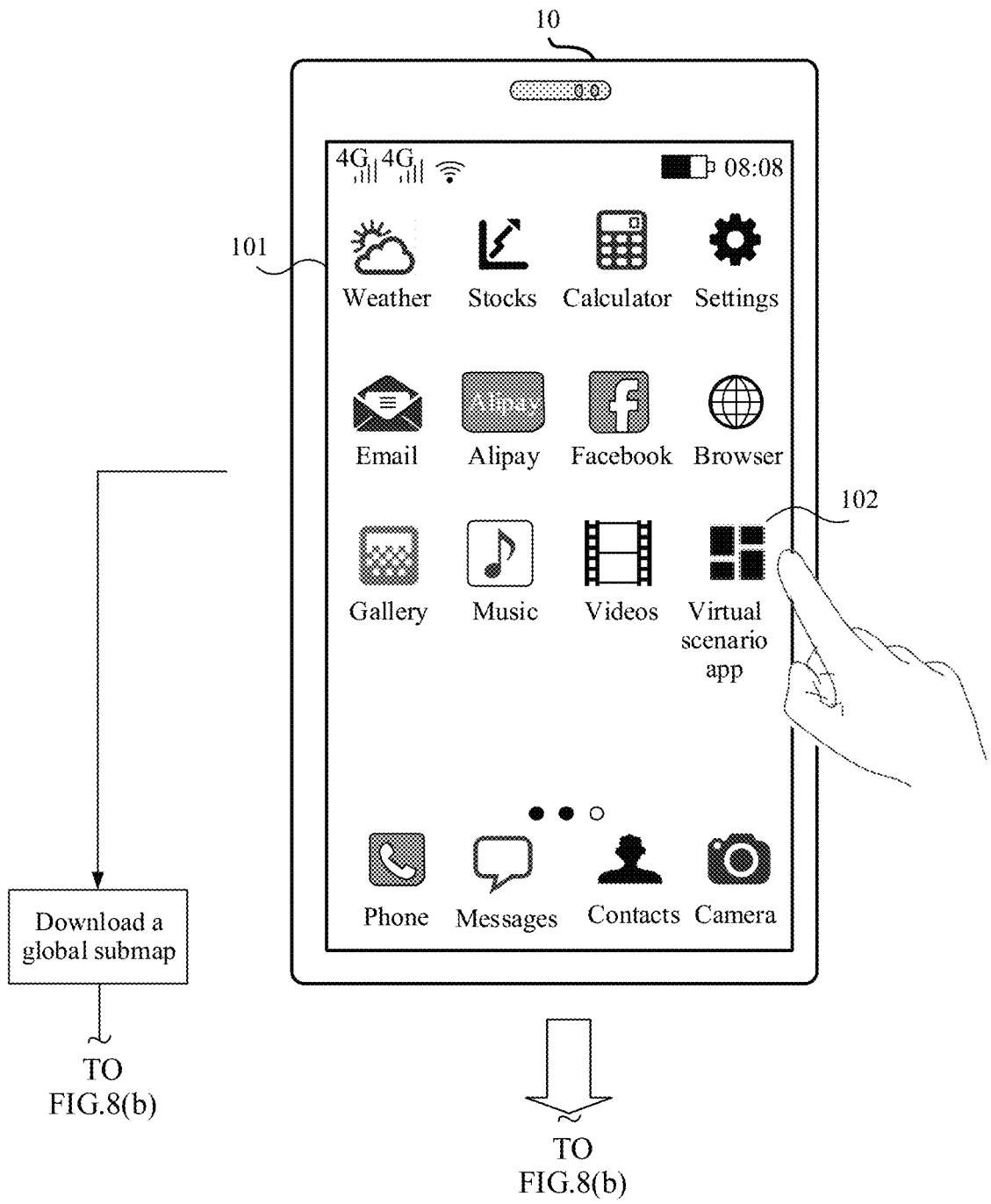
FIG. 8(a) to FIG. 8(c) are schematic diagrams of a scenario in which a method provided in this application is applied according to an embodiment of this application.
Figure 8B:
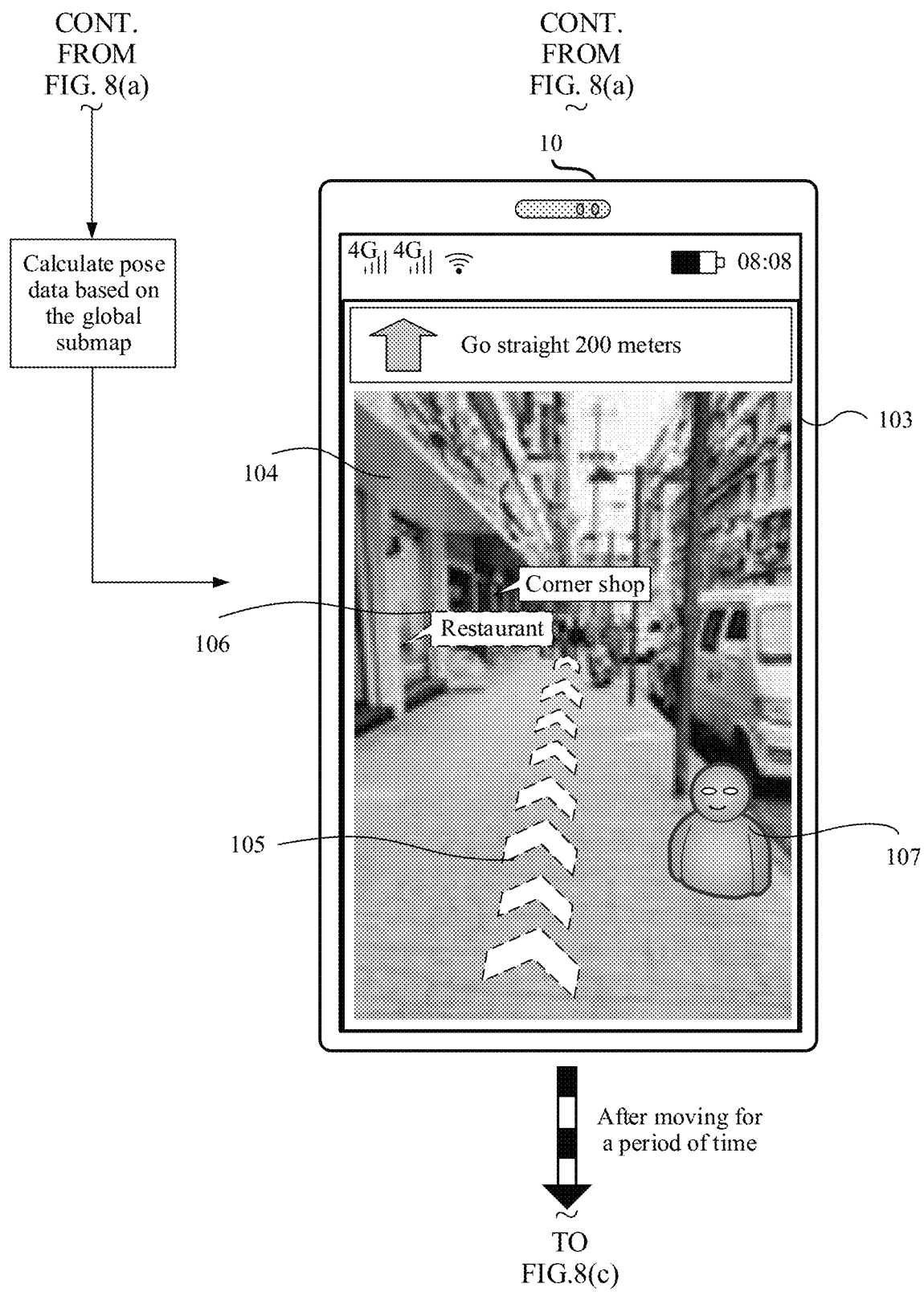
Figure 8C:
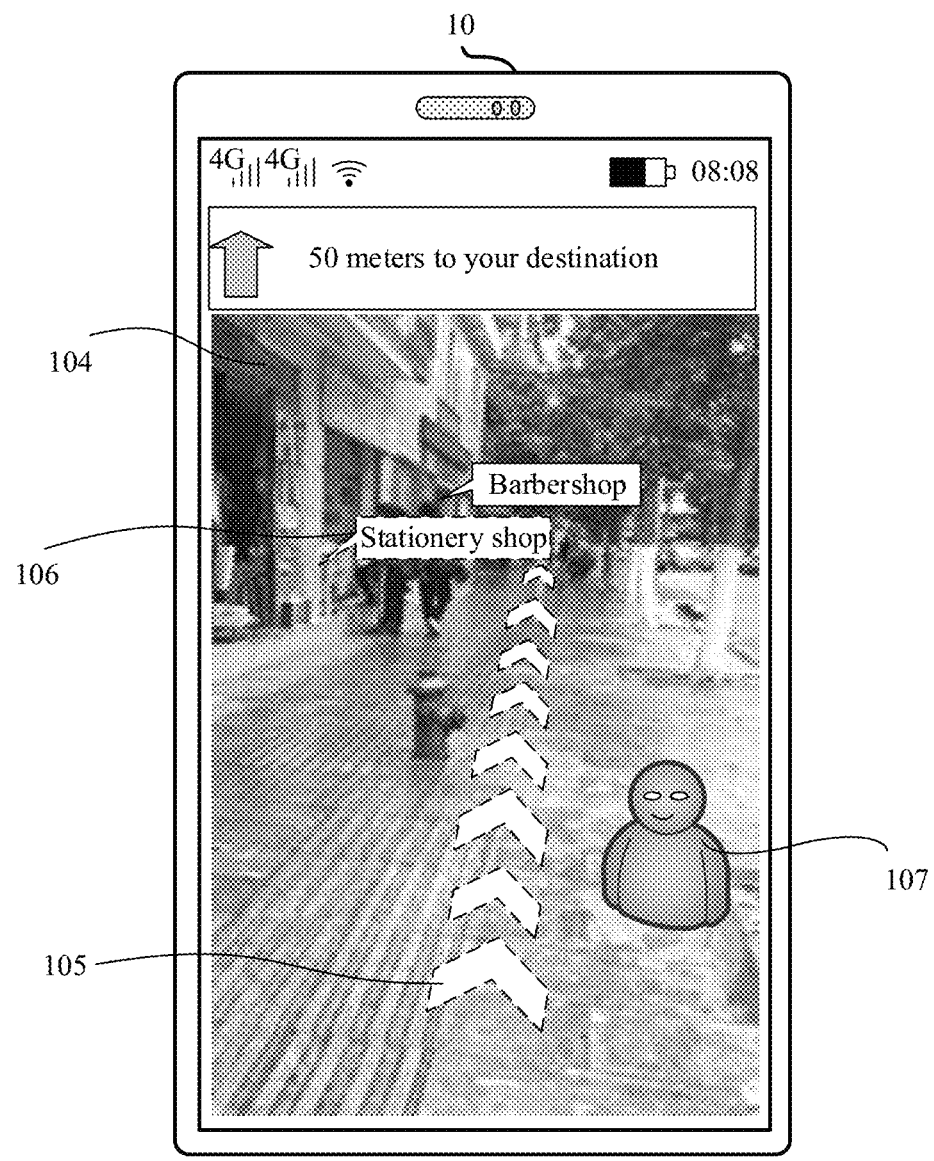
Figure 9A:
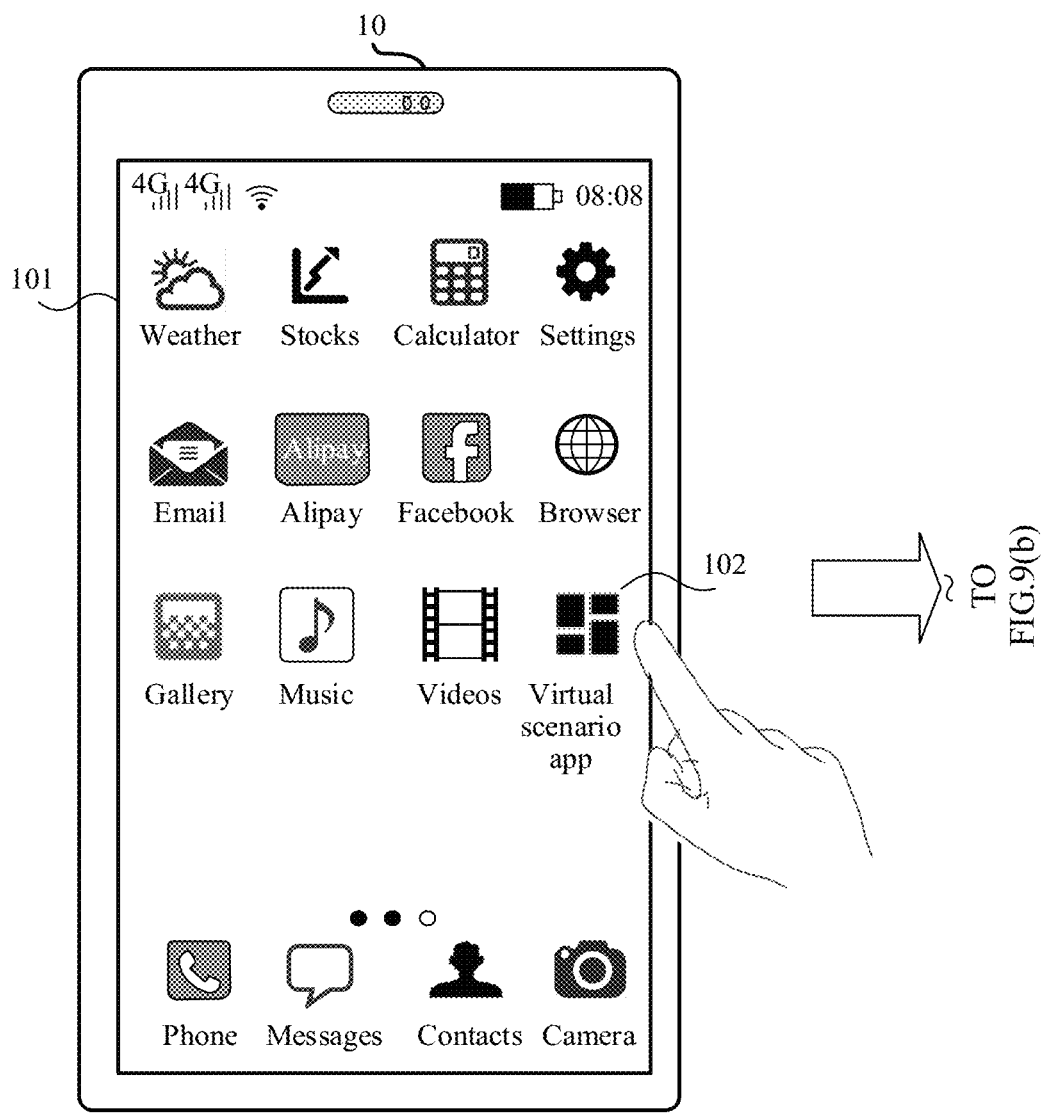
FIG. 9(a) to FIG. 9(d) are schematic diagrams of another scenario in which a method provided in this application is applied according to an embodiment of this application.
Figure 9B:
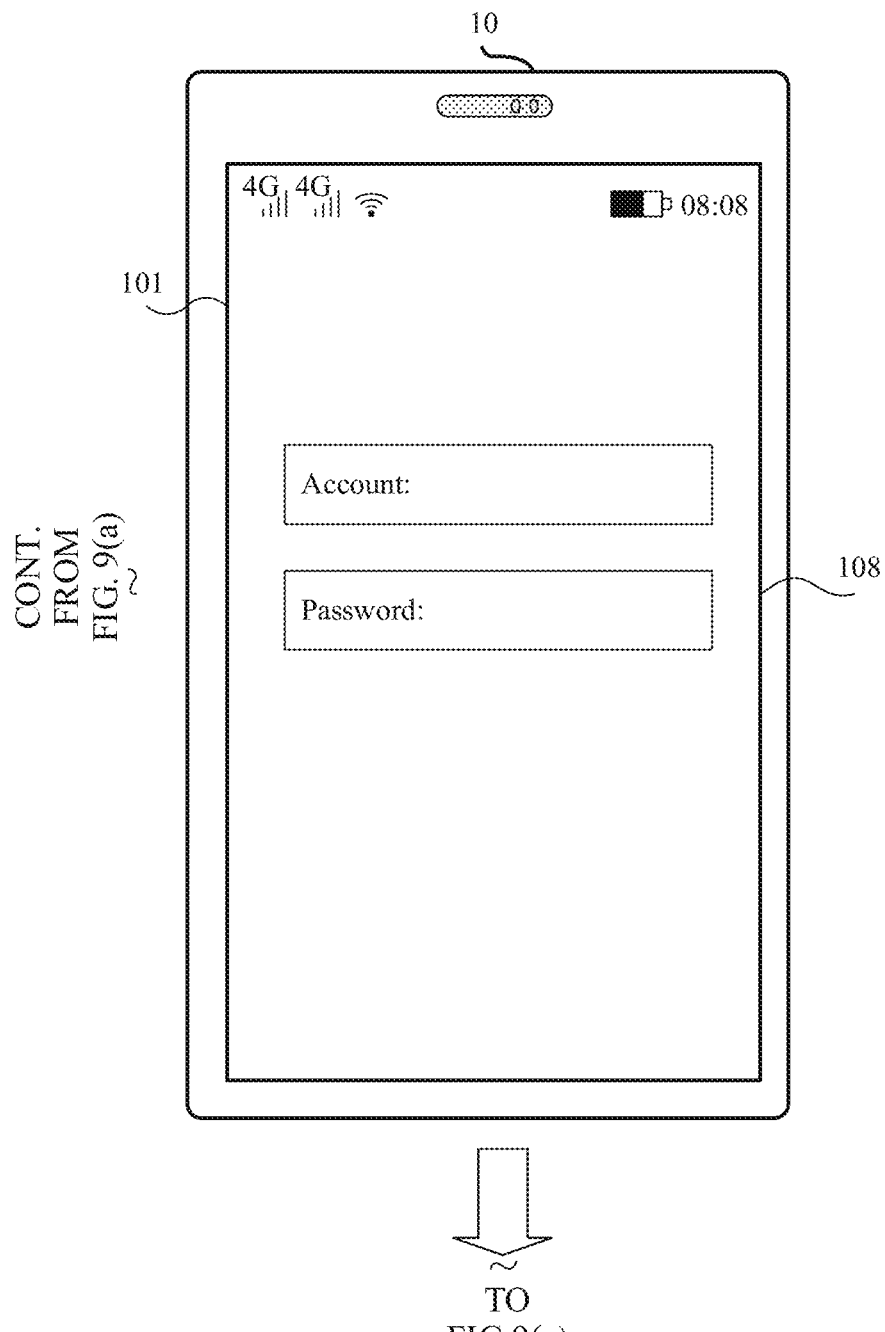
Figure 9C:
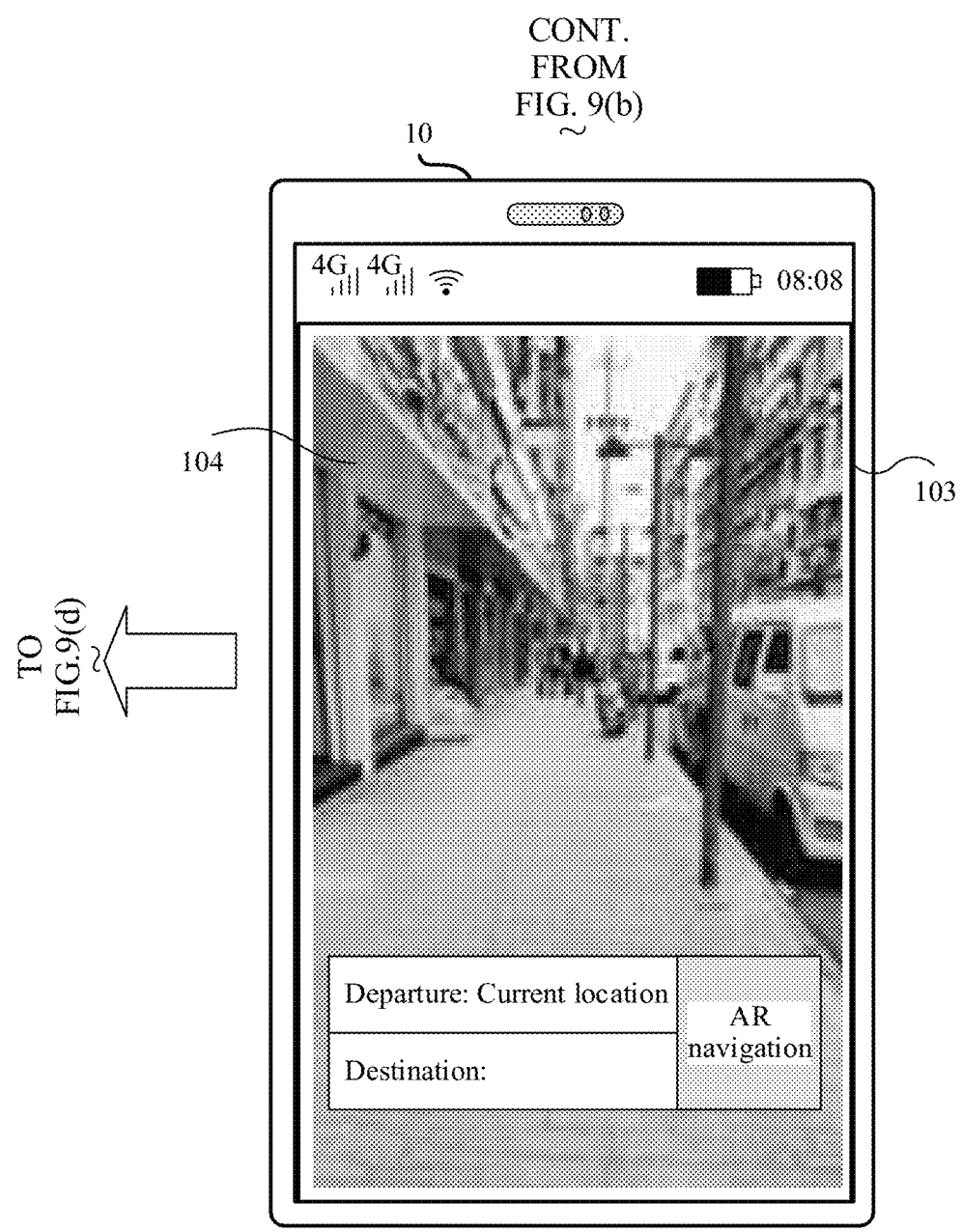
Figure 9D:
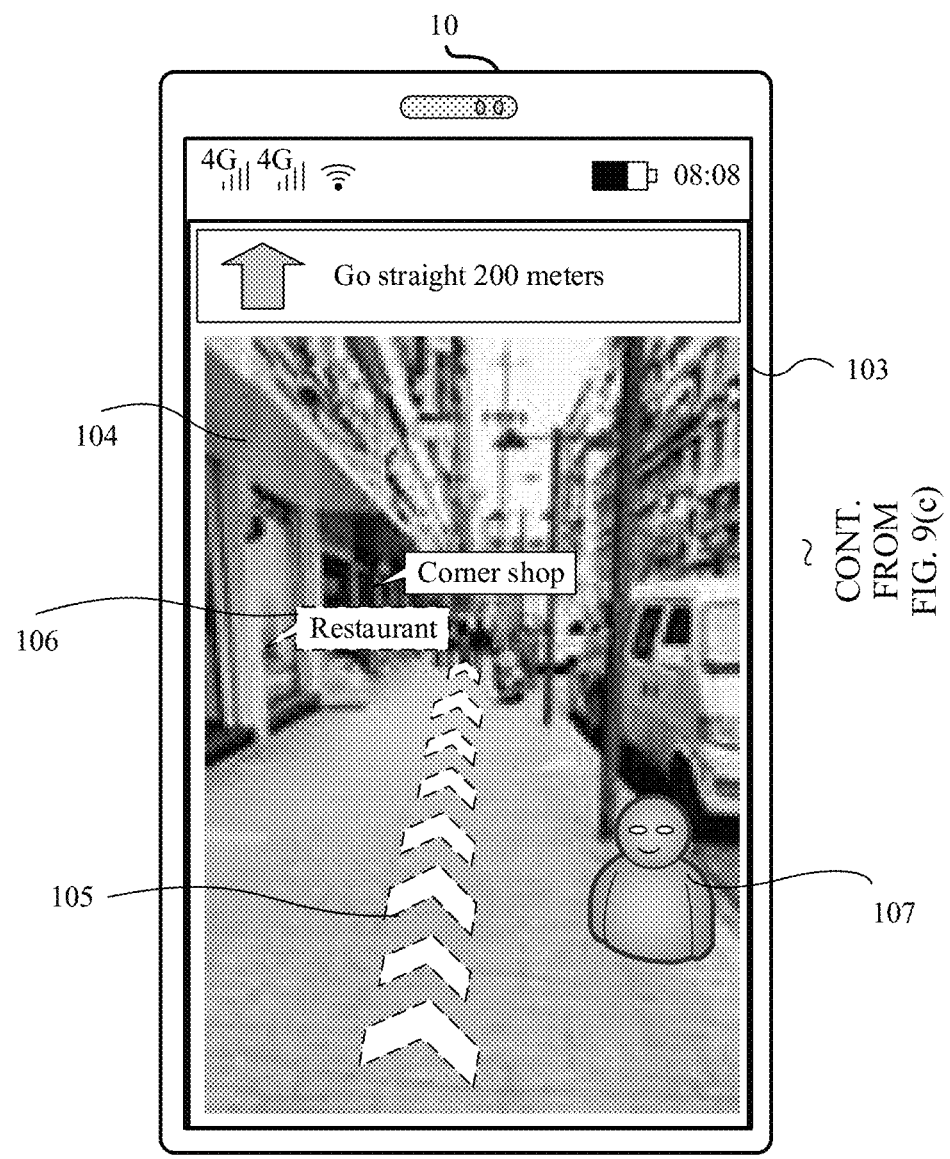
Figure 10A:
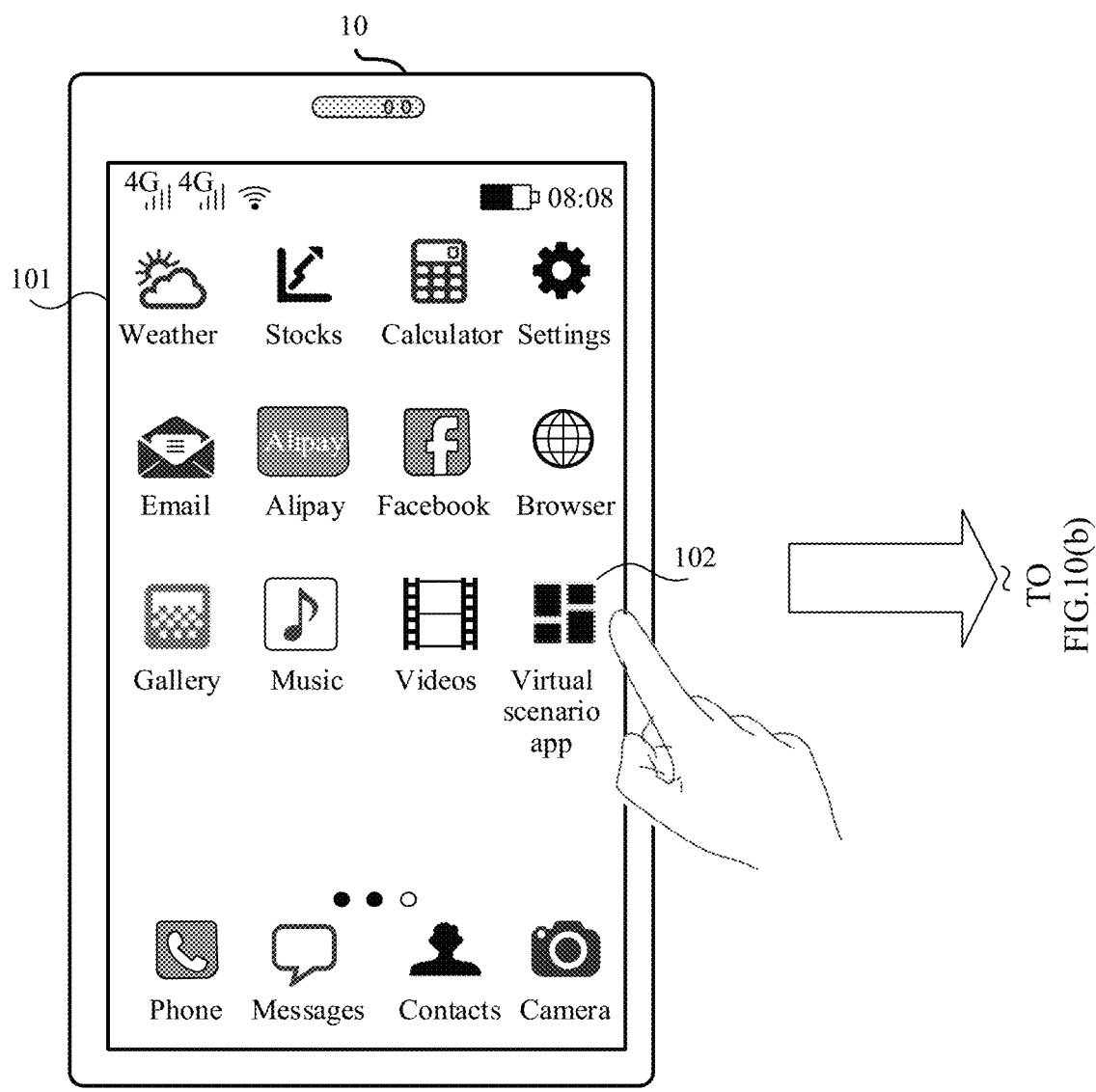
FIG. 10(a) to FIG. 10(d) are schematic diagrams of another scenario in which a method provided in this application is applied according to an embodiment of this application.
Figure 10B:
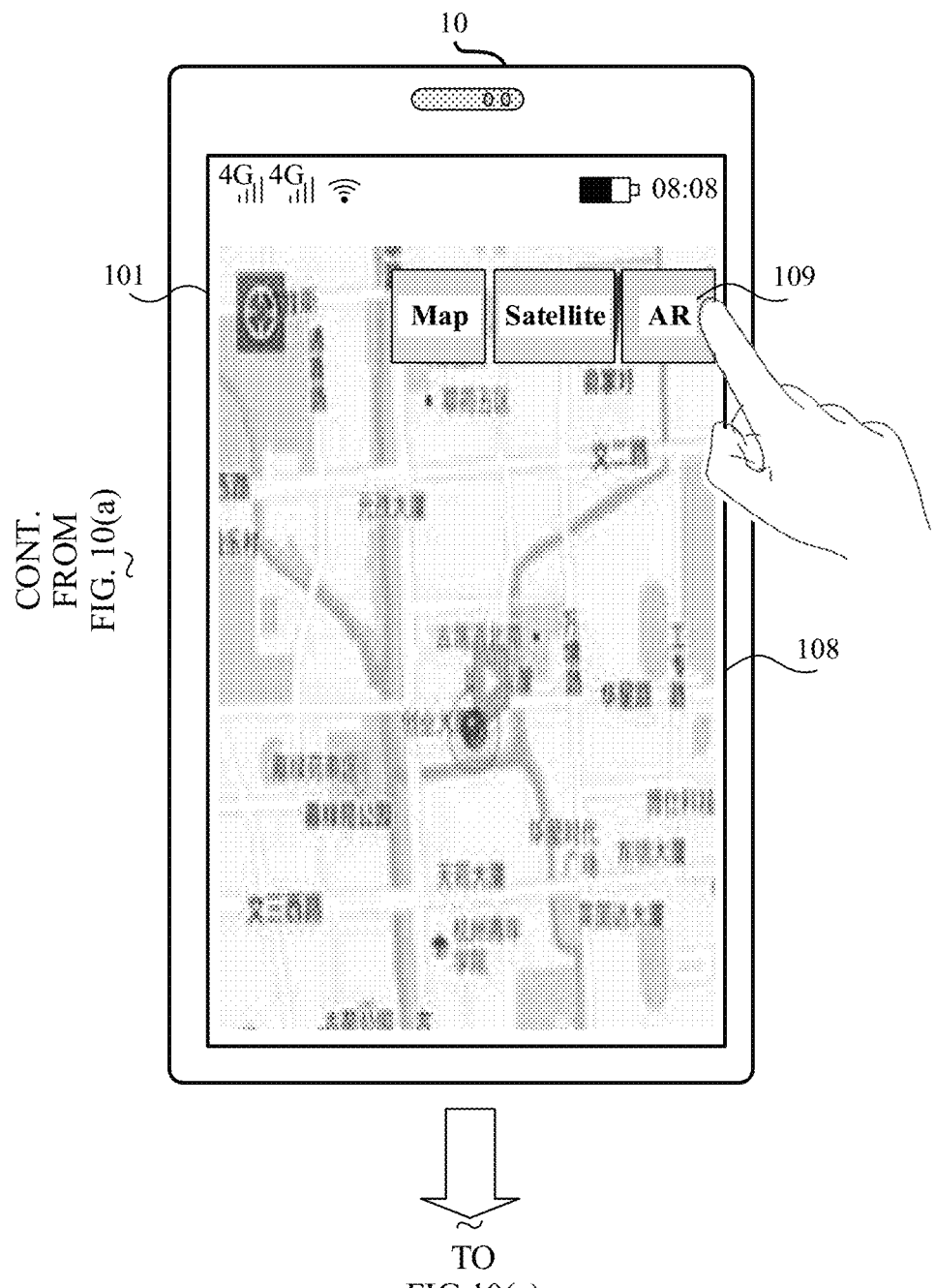
Figure 10C:
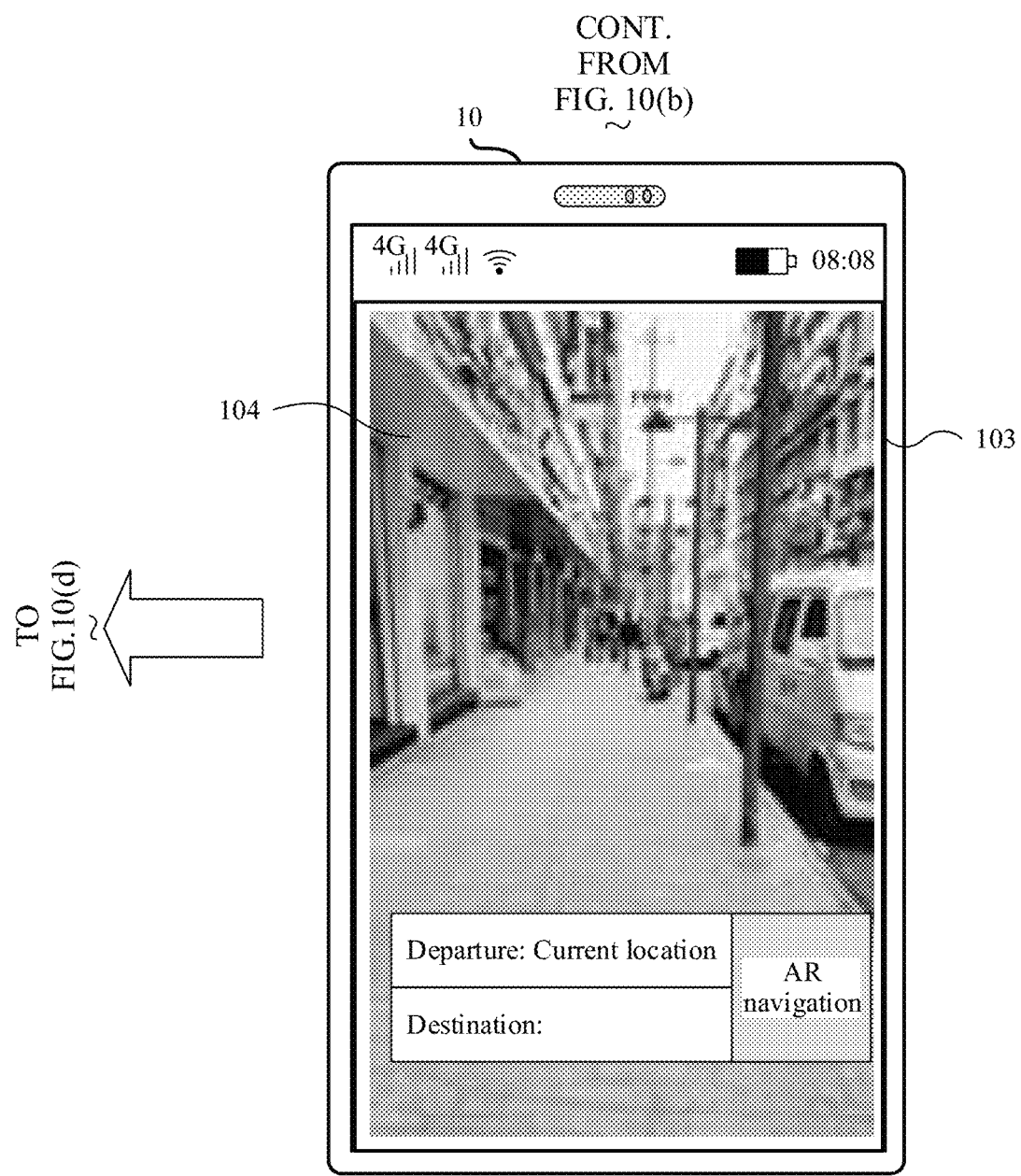
Figure 10D:
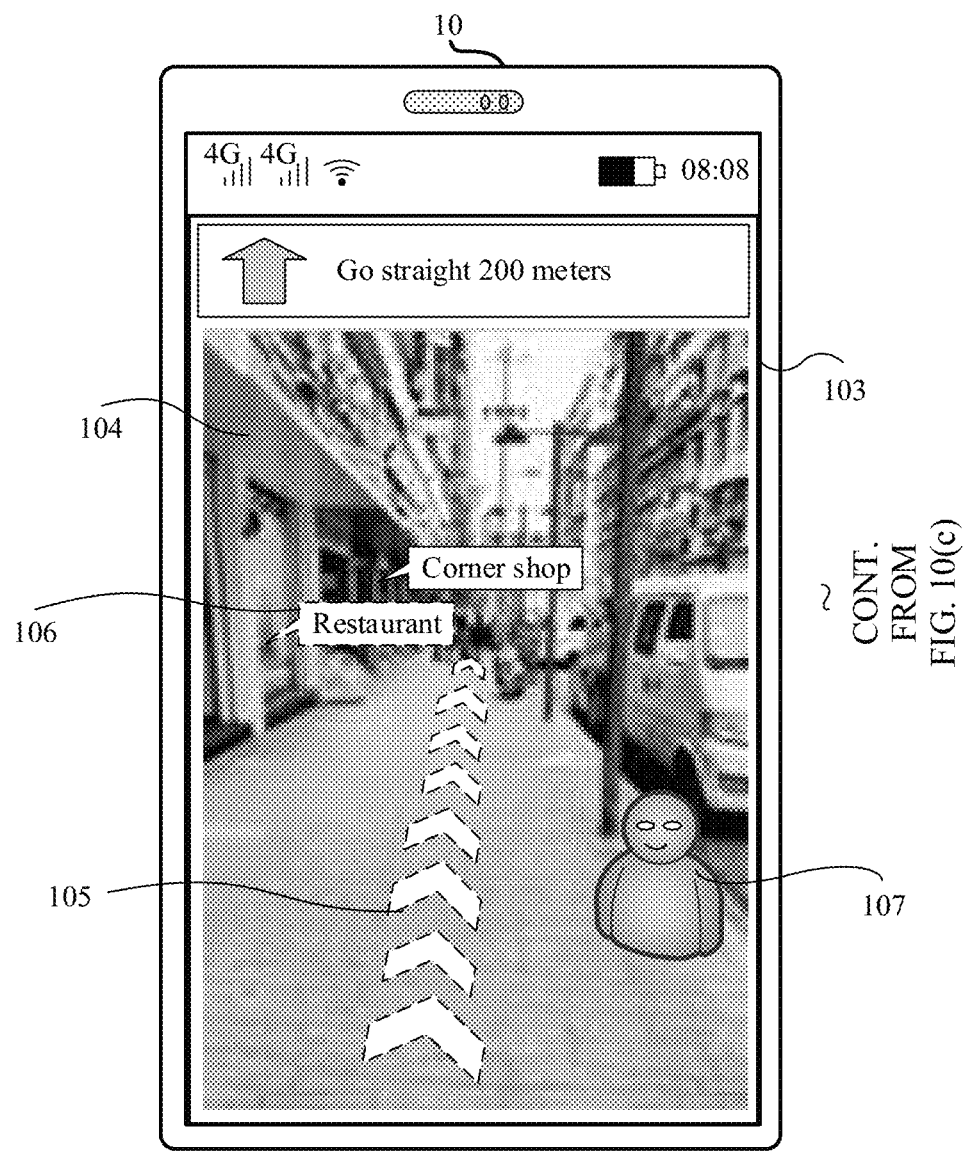

For example, refer to FIG. 8(a) to FIG. 8(c). In a possible implementation scenario, for example, the electronic device 10 is a mobile phone, and a virtual scenario app (for example, a navigation map app with AR functions) is installed on the electronic device 10. FIG. 8(a) shows a graphical user interface (GUI) on the display panel of the electronic device 10, where the GUI is a desktop 101 of the electronic device. After detecting an operation of tapping an icon 102 of a virtual scenario app on the desktop 101 by the user, the electronic device starts the process of downloading the global submap in the background, and displays another GUI shown in FIG. 8(b) on the display panel after the virtual scenario app is started. For example, the user interface 103 of the GUI is an AR navigation interface. The user interface 103 may also be referred to as a first interface. The user interface 103 may include a viewfinder frame 104. The viewfinder frame 104 may display in real time a preview video stream of a real environment in which the electronic device 10 is located. The preview video stream is photographed by the camera of the electronic device 10. A virtual object of the AR application is further superimposed on the preview video stream. There may be one or more virtual objects. As shown in FIG. 8(b), the virtual objects include, for example, a navigation indication 105, a storefront indication 106, and an interactive robot 107. The navigation indication 105 can indicate, in real time, a navigation route from a current location to a destination by using orientation arrows. The storefront indication 106 can accurately indicate a type name of a store in real time that appears explicitly or implicitly in the video stream indicating the viewfinder frame 104. The interactive robot 107 can be used for voice conversation, voice introduction, or is merely used as an interesting display on a street.

Specifically, the electronic device 10 performs pose calculation in the background (a processor) based on the obtained global submap and the video image photographed by the camera in real time, to obtain pose data (namely, a global pose) of the electronic device 10 currently in a global coordinate system in real time. The location and the posture of the virtual object in the AR scenario may be determined based on the global pose of the electronic device 10. In other words, the global pose of the electronic device represents the location and the posture of the virtual object. Therefore, the location and the posture of the virtual object in the AR scenario can be displayed in the viewfinder frame 104 in real time based on the global pose of the electronic device 10.

For example, the AR application may generate a virtual object by using computer graphics and visualization technologies, superimpose the virtual object in the viewfinder frame 104 based on a current global pose of the electronic device 10, and superimpose the virtual object in the viewfinder frame 104 onto the video stream of the viewfinder frame 104.

For example, after the electronic device 10 captures the video image by using the camera, the AR application sends the video image to an AR cloud server, to request the AR cloud server to obtain to-be-rendered object corresponding to the video image. The to-be-rendered object may include information such as an identifier and/or a name and metadata of the to-be-rendered object. The AR cloud server sends the to-be-rendered object corresponding to the video image to the electronic device 10. The electronic device 10 determines a service rule corresponding to the to-be-rendered object, and renders the corresponding to-be-rendered object according to the service rule of the to-be-rendered object, to generate a plurality of one or more AR objects (namely, virtual objects); and superimposes the virtual object onto the video stream of the viewfinder frame 104 based on the global pose of the electronic device 10.

In an embodiment, the global pose of the electronic device 10 is obtained by the electronic device 10 by performing pose calculation based on at least the video image collected by the camera of the electronic device 10 and the global submap at a high first frequency. The first frequency is a frequency at which the SLAM system of the electronic device 10 performs global pose estimation, namely, a frequency of calling the global submap. The first frequency may be numerically less than or equal to a frequency at which the display panel displays the video stream. In other words, the SLAM system of the electronic device 10 may call the global submap at a high fixed frequency, to track poses of the electronic device 10. In this way, after the global pose of the electronic device 10 is obtained in real time, the location and the posture of the virtual object in the AR scenario may be displayed and updated in real time in the viewfinder frame 104 based on the global pose of the electronic device 10.

When the user holding the electronic device 10 moves for a period of time (for example, 1 minute, 5 minutes, or 10 minutes, which is not limited herein), the electronic device 10 can always accurately superimpose the virtual object onto the video stream of the viewfinder frame 104 during this period of time. As shown in FIG. 8(*c*), after the electronic device 10 is moved for a period of time, the navigation indication 105, the storefront indication 106, and the interactive robot 107 can still be accurately displayed in the video stream of the viewfinder frame 104. Neither a pose drift phenomenon nor a pose jumping phenomenon occurs during this period of time. Reasons are as follows: During this period of time, the SLAM system of the electronic device 10 calculates the pose of the electronic device 10 based on the global submap, to overcome a problem that a pre-constructed SLAM map in the electronic device 10 is inaccurate, and maximally avoid accumulated pose errors and prevent occurrence of the drift phenomenon. In addition, the electronic device 10 can stably and frequently perform global pose estimation based on the global submap, thereby avoiding sudden changes in the global pose, maximally preventing occurrence of the jumping phenomenon, and improving user experience.

In an embodiment, when the electronic device 10 is about to move out of a geographic range of the global submap, the electronic device 10 may request to download a new global submap in advance based on a location of the electronic device 10. Subsequently, the electronic device 10 may perform global pose estimation based on the new global submap. This can further avoid sudden changes in poses during switching between geographic ranges corresponding to the two global submaps, and improve user experience.

Refer to FIG. 9(*a*) to FIG. 9(*d*). In still another possible implementation scenario, the process from tapping a virtual scenario app by a user to presenting an AR screen on the display panel may alternatively be implemented in the following manner.

Similarly, for example, the electronic device 10 is a mobile phone, and a virtual scenario app (for example, a navigation map app with AR functions) is installed on the electronic device 10. FIG. 9(*a*) shows a desktop 101 on the display panel of the electronic device 10. After detecting an operation that the user taps an icon 102 of the virtual scenario app on the desktop 101, the electronic device displays a user interface 108 shown in FIG. 9(*b*) on the display panel of the electronic device 10. The user interface 108 includes text boxes into which an account number and a password are input, to prompt the user to log in to the application through identity authentication. After detecting that the user enters the account and the password to log in, and verifying that the account and the password are correct, the electronic device 10 displays a user interface 103 of the application shown in FIG. 9(*c*) on the display panel. In FIG. 9(*c*), the user interface 103 may include a viewfinder frame 104. The viewfinder frame 104 may display in real time a preview video stream of a real environment in which the electronic device 10 is located. The preview video stream is photographed by the camera of the electronic device 10. Optionally, preset navigation input boxes may be further superimposed on the preview video stream, so that a departure and a destination for AR navigation can be input. In addition, a process of downloading the global submap is started in the background, which may take a period of time (for example, 2 seconds). However, a real screen in a video stream is currently presented to the user, and the user needs to spend some time in inputting the departure and destination in the AR navigation. Therefore, the user does not perceive the map downloading process. In this way, the user does not need to wait when the map is downloaded, thereby improving user experience.

Similarly, after the global submap is downloaded, the electronic device 10 may perform pose calculation in the background processor based on the obtained global submap and a video image photographed by the camera in real time, to obtain the pose data (namely, the global pose) of the electronic device 10 currently in the global coordinate system in real time. In this way, the location and the posture of the virtual object in the AR scenario can be displayed in the viewfinder frame 104 in real time based on the global pose of the electronic device 10. As shown in FIG. 9(*d*), for example, the navigation indication 105, the storefront indication 106, and the interactive robot 107 are virtual objects. The SLAM system of the electronic device 10 may call the global submap at a high fixed frequency, to track poses of the electronic device 10. In this way, after the global pose of the electronic device 10 is obtained in real time, the location and the posture of the virtual object in the AR scenario may be displayed and updated in real time in the viewfinder frame 104 based on the global pose of the electronic device 10. This can maximally avoid occurrence of the drift and jumping phenomena.

Refer to FIG. 10(*a*) to FIG. 10(*d*). In still another possible implementation scenario, the process from tapping a virtual scenario app by a user to presenting an AR screen on the display panel may alternatively be implemented in the following manner.

Similarly, for example, the electronic device 10 is a mobile phone, and a virtual scenario app (for example, a navigation map app with AR functions) is installed on the electronic device 10. FIG. 10(*a*) shows a desktop 101 on the display panel of the electronic device 10. After detecting an operation of tapping an icon 102 of the virtual scenario app on the desktop 101 by the user, the electronic device displays a user interface 108 of the application shown in FIG. 10(*b*) on the display panel of the electronic device 10. The user interface 108 includes an electronic map interface and multiple controls 109. As shown in the figure, the user interface 108 includes an electronic map control, a satellite map control, and an AR control. After detecting that the user taps the AR control, the electronic device 10 displays a user interface 103 of the application shown in FIG. 10(*c*) on the display panel. In FIG. 10(*c*), the user interface 103 may include a viewfinder frame 104. The viewfinder frame 104 may display in real time a preview video stream of a real environment in which the electronic device 10 is located. The preview video stream is photographed by the camera of the electronic device 10. Optionally, preset navigation input boxes may be further superimposed on the preview video stream, so that a departure and a destination for AR navigation can be input. In addition, a process of downloading the global submap is started in the background. Because a real screen in a video stream is currently presented to the user, and the user needs to spend some time in inputting the departure and destination in the AR navigation, the user does not perceive the map downloading process. In this way, the user does not need to wait when the map is downloaded, thereby improving user experience.

Similarly, after the global submap is downloaded, the electronic device 10 may perform pose calculation in the background processor based on the obtained global submap and a video image photographed by the camera in real time, to obtain the pose data (namely, the global pose) of the electronic device 10 currently in the global coordinate system in real time. In this way, the location and the posture of the virtual object in the AR scenario can be displayed in the viewfinder frame 104 in real time based on the global pose of the electronic device 10. As shown in FIG. 10(*d*), for example, the navigation indication 105, the storefront indication 106, and the interactive robot 107 are virtual objects. The SLAM system of the electronic device 10 may call the global submap at a high fixed frequency, to track poses of the electronic device 10. In this way, after the global pose of the electronic device 10 is obtained in real time, the location and the posture of the virtual object in the AR scenario may be displayed and updated in real time in the viewfinder frame 104 based on the global pose of the electronic device 10. This can maximally avoid occurrence of the drift and jumping phenomena.

FIG. 11 is a schematic flowchart of another method for displaying a virtual object according to an embodiment of this application. The method is separately described from an electronic device side and a server side. The method includes but is not limited to the following steps.

S201: A server delivers a global submap to an electronic device based on a request of the electronic device. Correspondingly, the electronic device receives the global submap. The global submap is a submap corresponding to a location of the electronic device in a global map.

S202: The electronic device stores the global submap in a SLAM system of the electronic device.

S203: The electronic device performs pose calculation at a first frequency based on a video image collected by a camera and the global submap, to continuously update a global pose of the electronic device.

The first frequency is a frequency at which the SLAM system of the electronic device performs global pose estimation, that is, a frequency at which the SLAM system calls the global submap. The first frequency may be numerically less than or equal to a frequency at which a display component displays a video stream. For example, the first frequency is 30 frames per second. Certainly, this is merely an explanation rather than a limitation. In other words, the SLAM system may call the global submap at a high fixed frequency, to track poses of the electronic device. In this way, after the global pose of the electronic device is obtained in real time, a location and a posture of the virtual object in an AR/VR/MR virtual scenario can be displayed on the display component based on the global pose of the electronic device.

The global pose of the electronic device is used to represent a location and a posture (orientation) of the electronic device in a global coordinate system. For example, the location may be represented by using three coordinate axes x, y, and z, and the pose (orientation) may be represented by using ($\alpha$, $\beta$, $\gamma$), where ($\alpha$, $\beta$, $\gamma$) represent angles of rotation around the three axes.

In a possible embodiment, the camera is disposed in the electronic device. In each global pose calculation, an input signal of the SLAM system includes the video image collected by the camera and the global submap, and the SLAM system may perform matching in the global submap based on the video image collected by the camera, to calculate the global pose of the electronic device in the global submap.

In another possible embodiment, an inertial measurement unit (IMU) is disposed in the electronic device. In each global pose calculation, an input signal of the SLAM system includes the video image collected by the camera, motion data collected by the IMU, and the global submap. The IMU detects an angular velocity and a linear acceleration of the electronic device at a high frequency, and separately performs an integral operation on the angular acceleration and the linear acceleration, to calculate a pose of the electronic device (for example, the pose herein may be referred to as an IMU-measured pose). Matching is performed on the video image collected by the camera in the global submap, so that the pose of the electronic device may alternatively be calculated (for example, the pose herein may be referred to as an image-based pose). In this case, an accurate final pose may be obtained based on the IMU-measured pose and the image-based pose, and the final pose is used as the global pose of the electronic device in the global submap.

In still another possible embodiment, a pose-related or motion-related positioning (for example, GPS positioning, BeiDou positioning, Wi-Fi positioning, or base station positioning) module is further disposed in the electronic device, in addition to the camera and the IMU. In this case, the SLAM system may further calculate the global pose of the electronic device in the global submap based on the video image collected by the camera, the motion data collected by the IMU, the global submap, and data collected by the positioning module.

S204: The electronic device displays the virtual object on the display component based on the global pose of the electronic device.

It may be learned that, an IMU signal and an image signal are used as an input to the SLAM system for pose estimation of the camera. In the process, SLAM map data is used as an input for pose estimation. Although long-time drift of the SLAM map can be reduced by correcting the SLAM map by an internal loop closure module, a great error still exists. Therefore, in the solution of this application, the downloaded submap is used as an input to a pose estimation module, and the submap has same functions as the SLAM map for pose estimation. However, the submap has higher accuracy than the SLAM map. Using the submap as an input for pose estimation can avoid long-time drift in pose estimation, and can eliminate long-time drift and jumping phenomena occurring on the SLAM map.

It may be learned that, in this embodiment of this application, the electronic device requests to download the global submap from the server, and inputs the global submap with higher definition than the SLAM map as visual observation into the SLAM system. The SLAM system of the electronic device may call the global submap at a high fixed frequency, to track poses of the electronic device. In this way, after the global pose of the electronic device is obtained in real time, the location and the posture of the virtual object in an AR scenario may be displayed and updated in real time on the display component based on the global pose of the electronic device. In addition, the drift or jumping phenomenon does not occur on the location and the posture of the virtual object over the long-time pose updating process. Reasons are as follows: During this period of time, the SLAM system of the electronic device calculates the global pose of the electronic device based on the global submap, to overcome a problem that the pre-constructed SLAM map in the electronic device is inaccurate, and maximally avoid accumulated pose errors and prevent occurrence of the drift phenomenon. In addition, the electronic device can stably and frequently perform global pose estimation based on the global submap, thereby greatly reducing sudden changes in the global pose. Furthermore, the global pose calculation process is completed on the electronic device side, so that a delay of pose estimation algorithms is low, and pose tracking effects are good. Therefore, in this embodiment, the virtual object can be accurately displayed for a long time without incurring deviations and errors in screens, and a jumping phenomenon of the virtual object resulting from sudden changes in poses can be eliminated. This further improves user experience.

FIG. 12 is a schematic flowchart of still another method for displaying a virtual object according to an embodiment of this application. The method is separately described from an electronic device side and a server side. The method includes but is not limited to the following steps.

S301: The electronic device sends, to the server, first location fingerprint information used to indicate an initial location of the electronic device.

In this embodiment of this application, the electronic device uploads location fingerprint information to the server. The initial location may be geographic location information of the electronic device generated when the electronic device requests to download the map. For example, the location fingerprint information may be initial location information, signal strength information, or signal feature information measured through GNSS/Wi-Fi/Bluetooth/base station positioning; or the location fingerprint information may be location information input by a user.

S302: The server obtains, from a global map, a global submap that matches the first location fingerprint information. The global submap is a submap corresponding to a location of the electronic device in the global map.

S303: The server delivers the global submap to the electronic device. Correspondingly, the electronic device receives the global submap.

In an embodiment, the server performs matching, based on the first location fingerprint information, on location fingerprint information of a submap pre-stored by the server in a database, where the submap in the database is a submap of the global map. If there is a matched submap, the server transmits the matched submap to the electronic device.

In another embodiment, the server traverses, based on the first location fingerprint information, the global map stored in the server until an area that matches the location fingerprint information is found; and the server extracts the area from the global map as the global submap, and transmits the global submap to the electronic device.

S304: The electronic device stores the global submap in a SLAM system of the electronic device.

S305: The electronic device calculates coordinate system transform information, and transforms a SLAM map based on the coordinate system transform information.

Specifically, a process in which the electronic device calculates the coordinate system transform information may be as follows: The electronic device obtains the $K^{th}$ frame of image in a video image sequence collected by a camera, where K is an integer greater than or equal to 1; and determines a local pose (which may be referred to as first pose data herein) of the electronic device in the SLAM map in an originally constructed local coordinate system based on the $K^{th}$ frame of image and the SLAM map.

For example, an IMU is disposed in the electronic device, and an input signal of the SLAM system includes a video image collected by the camera, motion data collected by the IMU, and the SLAM map in the local coordinate system. The IMU detects an angular velocity and a linear acceleration of the electronic device at a high frequency, and separately performs an integral operation on the angular acceleration and the linear acceleration, to calculate a pose of the electronic device. Matching is performed on the video image collected by the camera in the SLAM map in the local coordinate system, so that a pose of the electronic device may alternatively be calculated. Therefore, the first pose data may be obtained based on the two poses according to an algorithm.

For another example, a pose-related or motion-related positioning (GPS/BeiDou/Wi-Fi/base station positioning) module is further disposed in the electronic device, in addition to the camera and the IMU. In this case, the SLAM system may further calculate the first pose data based on the video image collected by the camera, the motion data collected by the IMU, the SLAM map in the local coordinate system, and data collected by the positioning module.

In another aspect, feature extraction may be performed on the $K^{th}$ frame of image based on the $K^{th}$ frame of image and the global submap, and feature matching is performed with the global submap, to further determine a global pose (which may be referred to as second pose data herein) of the electronic device in the global submap.

For example, the electronic device performs feature detection on the $K^{th}$ frame of image, and extracts an image location of a feature from the $K^{th}$ frame of image, where feature detection algorithms include but are not limited to FAST, ORB, SIFT, SURF, D2Net, and SuperPoint. Then, the electronic device describes each detected feature, to obtain a one-dimensional vector for subsequent feature matching, where feature description algorithms may include but are not limited to ORB, SIFT, SURF, BRIEF, BRISK, FREAK, D2Net, and SuperPoint. The electronic device may obtain, from the global submap through feature matching, map content (for example, one or more frames of key frames) most similar to the $K^{th}$ image frame, where specific methods include conventional image retrieval methods such as BOW and VLAD and novel image retrieval methods such as NetVLAD and AI. Feature matching specifically means to calculate a similarity between two feature descriptions. A Euclidean distance may be calculated for float vectors, and an XOR operation may be performed for binary vectors. After finding the map content most similar to the $K^{th}$ frame image, the electronic device may perform pose estimation based on the $K^{th}$ frame image and the most similar map content, and calculate the second pose data according to registration algorithms such as PnP, EPnP, and 3D-3D.

Then, the electronic device may obtain coordinate system transform information between a first coordinate system of the SLAM map and a second coordinate system of the global map based on the first pose data and the second pose data, where the coordinate system transform information may be, for example, a coordinate system transform matrix.

Figure 13:
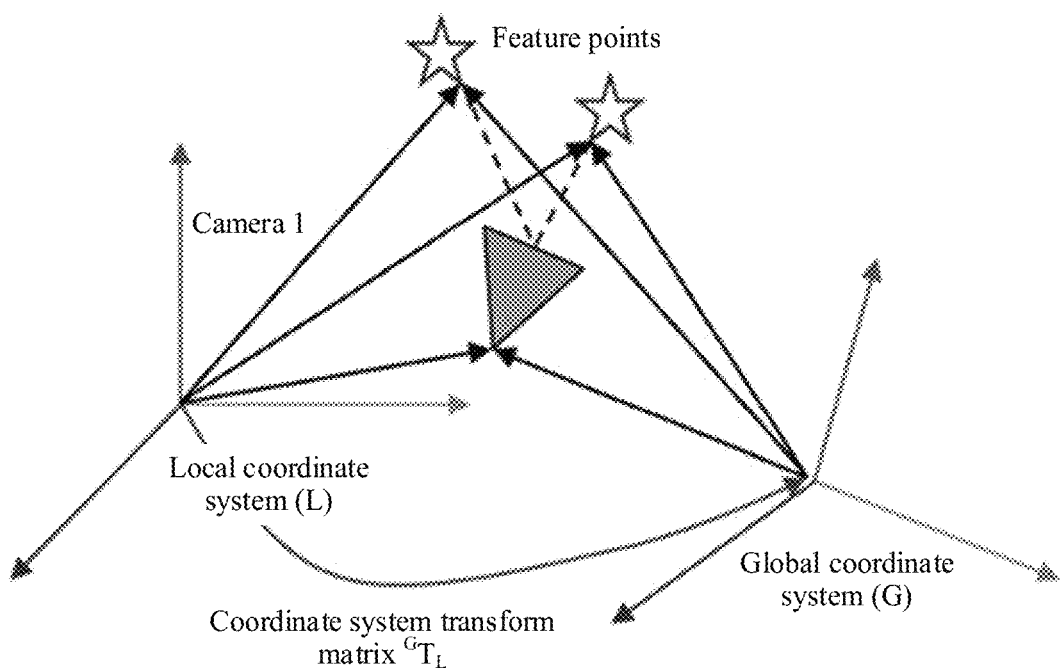
FIG. 13 is a schematic diagram of a scenario related to a coordinate system transform matrix according to an embodiment of this application.

For example, as shown in FIG. 13, if a pose (the first pose data) of the $K^{th}$ frame of image in the local coordinate system is $^{L}T_c$, and a pose (the second pose data) in the global coordinate system is $^{G}T_c$, $$^{G}T_c = {}^{G}T_L {}^{L}T_c \tag{1}$$

$$^{G}T_L = {}^{G}T_c ({}^{L}T_c)^{-1} \tag{2}$$

Herein, $^{G}T_L$ may represent the coordinate system transform matrix between the local coordinate system and the global coordinate system, and the two coordinate systems may be synchronized based on the coordinate system transform matrix. In this way, information originally represented in the local coordinate system (for example, the local pose, feature points of images, 3D map points of the SLAM map) can be transformed to be represented in the global coordinate system based on the coordinate system transform matrix.

In a specific embodiment, after obtaining the coordinate system transform information, the electronic device may transform the SLAM map in the local coordinate system to a SLAM map in the global coordinate system based on the coordinate system transform information, that is, obtain the SLAM map in the global coordinate system.

S306: The electronic device performs pose calculation based on the video image collected by the camera and the global submap, to obtain the global pose of the electronic device.

After synchronization between the coordinate systems is implemented in S305, a coordinate system of the 3D map points in the global submap can be unified with a coordinate system of the SLAM system. In some embodiments, the 3D map points in the global submap may be input into the SLAM system as measured values, thereby implementing tight coupling between the global submap and the SLAM system. Furthermore, the global pose of the electronic device is tracked in real time through pose estimation.

Specifically, a pose (the local pose) in the local coordinate system and the 3D map points of the SLAM map may be transformed in the global coordinate system based on the coordinate system transform information. In this way, the pose and the 3D map points in the SLAM system and 3D map points in the global submap are represented in a same coordinate system. Furthermore, the 3D map points in the global submap may be used as measured value of the SLAM system. This can effectively eliminate the drift phenomenon of pose tracking in the SLAM system.

For example, in a pose estimation algorithm, conventional visual measured values (the 3D map points of the SLAM map) are calculated according to a triangulation algorithm of the SLAM system in the local coordinate system, but accuracy of the 3D map points generated through triangulation algorithm depends on accuracy of pose estimation. Because long-time drift exists in pose estimation, a great error exists in the 3D map points of the SLAM map calculated by the SLAM system. Conversely, a great error may be caused to pose estimation if these 3D map points are used as measured values, as shown in Formula (3):

$$r_i^{(j)} = z_i^{(j)} - \hat{z}_i^{(j)} = z_i^{(j)} - h(^{L}p_j, {}^{L}P_i) \tag{3}$$

In the formula, $r_i^{(j)}$ represents the pose error generated in the conventional manner, i represents an image frame index, j represents a feature index observed in an image frame, L represents a description in the local coordinate system of the SLAM system, p represents a 3D coordinate value of a feature point, P represents the pose of the electronic device, z represents an observed value of a 2D feature on an image, $\hat{z}$ represents a 2D coordinate value projected, by using a camera projection function h, on the image based on the estimated pose of the electronic device and 3D coordinates corresponding to the 2D feature, and $^{L}p_j$ represents coordinate values of the 3D map points calculated according to the triangulation algorithm in the SLAM system, where the coordinate values are used as measured values in the SLAM algorithm.

However, in this embodiment of this application, the more accurate 3D map point in the SLAM system is used to replace the 3D map points of the SLAM map generated by the SLAM system, so that errors in pose estimation can be eliminated, as shown in Formula (4).

$$r_i^{(j)} = z_i^{(j)} - \hat{z}_i^{(j)} = z_i^{(j)} - h(^{G}p_j, {}^{G}P_i) \tag{4}$$

$r_i^{(j)}$ represents a pose error generated by using the solution in this embodiment of this application, G represents a description in the global coordinate system, $^{G}p_j$ represents a coordinate value of a 3D map point corresponding to the $j^{th}$ feature observed in the $i^{th}$ image frame, where the coordinate value comes from the global submap; $^{G}p_j$ may be alternatively from the SLAM map in the global coordinate system after coordinates of a point in the SLAM map are converted into coordinates in the global coordinate system; and $^{G}p_j$ represents a 3D map point in the global submap, and is used as a measured value in the SLAM algorithm.

S307: The electronic device displays the virtual object on the display component based on the global pose of the electronic device.

S308: The electronic device updates the SLAM map in the global coordinate system based on the global pose of the electronic device.

It may be understood that the electronic device can display and update the virtual object on the display component in real time based on the global pose of the electronic device and feed back the global pose of the electronic device to the SLAM map in the global coordinate system because both the pose and the SLAM map of the electronic device have been converted to a corresponding pose and SLAM map in the global coordinate system. A current image frame (a key frame) is fused into the SLAM map in the global coordinate system based on the global pose, thereby expanding/extending the SLAM map. In addition, the updated SLAM map is more accurate than the conventional SLAM map.

It may be learned that in this embodiment of this application, the pose of the terminal in the local coordinate system and the pose of the terminal in the global coordinate system are separately obtained based on a same frame. Coordinate system transform information (for example, a coordinate system transform matrix) between the two coordinate systems can be obtained based on the two poses, so that synchronization between the two coordinate systems can be implemented based on the coordinate system transform matrix. In this way, information (for example, the local pose, the feature points of images, the 3D map points in the SLAM map) previously represented in the local coordinate system can be transformed to information in the global coordinate system based on the coordinate system transform matrix. In this way, the pose and the 3D map points in the SLAM system can be represented in a same coordinate system as the 3D map points in the global submap. Further, the 3D map points in the global submap may be input into the SLAM system as measured values, thereby implementing tight coupling between the global submap and the SLAM system. Furthermore, the global pose of the electronic device is tracked in real time through pose estimation, thereby effectively eliminating drift in SLAM pose tracking. When the SLAM map needs to be subsequently updated, the global pose of the electronic device may be used as pose data of the electronic device in the SLAM map in the global coordinate system to update the SLAM map in the second coordinate system, thereby improving accuracy of the SLAM map.

In addition, in this embodiment of this application, the first pose data, the second pose data, and the coordinate system transform information are calculated by fully using computing capabilities of the electronic device. This improves processing efficiency, and reduces a processing delay and computing load of the server.

Figure 14:
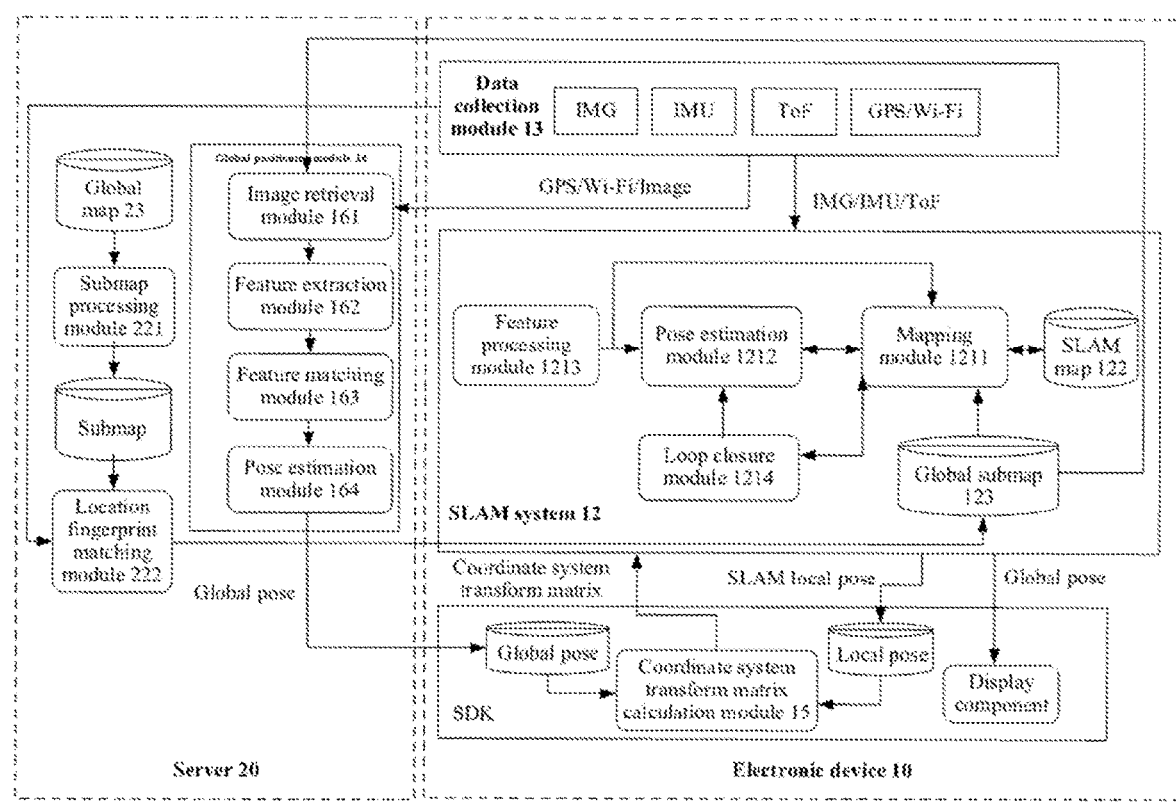
FIG. 14 is a schematic diagram depicting a structure of another system and an electronic device and a server in the system according to an embodiment of this application.

FIG. 14 shows components potentially included in the functional modules of the electronic device 10 shown in FIG. 5, and components potentially included in the functional modules of the server 20 in another specific implementation. A main difference between the embodiment in FIG. 14 and the embodiment in FIG. 6 lies in that, in the functional module architecture described in the embodiment in FIG. 14, functions of the global localization module 16 are configured on the server 20 side. To be specific, the server 20 further includes an image retrieval module 161, a feature extraction module 162, a feature matching module 163, and a pose estimation module 164.

The global localization module 16 in the server 20 is configured to: obtain, at an initial moment or any subsequent moment, at least one frame of video image uploaded by the electronic device; calculate a global pose (namely, second pose data) of the electronic device 10 in the global submap based on the video image; and send the second pose data to the electronic device 10. Specifically, the image retrieval module 161 obtains the $K^{th}$ frame of image in the video image sequence uploaded by the electronic device 10; the feature extraction module 162 performs feature extraction based on the $K^{th}$ frame of image, to obtain an image feature; the feature matching module 163 performs feature matching on the image feature in the global submap to obtain a map feature that matches the image feature; and the pose estimation module 164 calculates the second pose data of the electronic device 10 in the global submap based on the image feature and the map feature, and sends the second pose data to the electronic device 10.

For components potentially included in other functional modules in the server 20 shown in FIG. 14, refer to related descriptions of the server 20 in the foregoing embodiment in FIG. 6. For brevity of the specification, details are not described herein again.

For components potentially included in the functional modules of the electronic device 10 shown in FIG. 14, refer to related descriptions of the electronic device 10 in the foregoing embodiment in FIG. 6. For brevity of the specification, details are not described herein again.

In a specific embodiment, the functional modules in the electronic device 10 may collaborate with each other, to execute functions on an electronic device side in the embodiment shown in FIG. 15. The functional modules in the server 20 may collaborate with each other to perform functions on a server side in the embodiment shown in FIG. 15.

FIG. 15 is a schematic flowchart of still another method for displaying a virtual object according to an embodiment of this application. The method is separately described from an electronic device side and a server side. The method includes but is not limited to the following steps.

S501: The electronic device sends, to the server, first location fingerprint information used to indicate an initial location of the electronic device and at least one frame of video image.

In a specific embodiment, to implement first time of global positioning for the electronic device, the electronic device needs to upload location fingerprint information and at least one or more currently collected video images to the server. The at least one frame of video image may be the $K^{th}$ frame of image in a video image sequence photographed by using a camera of the electronic device. For example, the $K^{th}$ frame of image may be the first frame of image in the video image sequence photographed by the camera. The initial location indicated by the location fingerprint information may be geographic location information of the electronic device generated when the electronic device requests to download a map. For example, the location fingerprint information may be initial location information, signal strength information, or signal feature information measured through GNSS/Wi-Fi/Bluetooth/base station positioning; or the location fingerprint information may be location information input by a user.

In a specific implementation, the electronic device may pack the first location fingerprint information and one frame of video image together and send them to the server.

In another specific implementation, the electronic device may separately send the first location fingerprint information and one frame of video image to the server.

S502: The server obtains, from a global map, a global submap that matches the first location fingerprint information. The global submap is a submap corresponding to a location of the electronic device in the global map.

In an embodiment, the server performs matching, based on the first location fingerprint information, on location fingerprint information of a submap pre-stored by the server in a database, where the submap in the database is a submap of the global map. If there is a matched submap, the submap is the global submap that needs to be subsequently delivered to the electronic device.

In another embodiment, the server traverses, based on the first location fingerprint information, the global map stored in the server until an area that matches the location fingerprint information is found, and the server extracts the area from the global map as the global submap.

S503: The server performs pose calculation based on the video image and the global submap, to obtain a global pose (which may also be referred to as second pose data herein) of the electronic device in the global submap.

In an embodiment of this application, first calculation of the global pose of the electronic device may be performed on the server side. A process in which the server performs global pose calculation also includes processes such as image retrieval, feature extraction, feature matching, and pose estimation.

For example, the server performs feature detection on the video image, and extracts an image location of a feature from the video image, where feature detection algorithms include but are not limited to FAST, ORB, SIFT, SURF, D2Net, and SuperPoint. Then, the electronic device describes each detected feature, to obtain a one-dimensional vector for subsequent feature matching, where feature description algorithms may include but are not limited to ORB, SIFT, SURF, BRIEF, BRISK, FREAK, D2Net, and SuperPoint. The server may obtain, from the global submap through feature matching, map content (for example, one or more frames of key frames) most similar to the video image, where specific methods include conventional image retrieval methods such as BOW and VLAD and novel image retrieval methods such as NetVLAD and AI. Feature matching specifically means to calculate a similarity between two feature descriptions. A Euclidean distance may be calculated for float vectors, and an XOR operation may be performed for binary vectors. After finding the map content most similar to the video image, the server may perform pose estimation based on the video image and the most similar map content, and calculate the second pose data according to registration algorithms such as PnP, EPnP, and 3D-3D.

S504: After completing pose estimation, the server delivers the global pose (the second pose data) of the electronic device in the global submap to the electronic device. Correspondingly, the electronic device receives the second pose data. The electronic device may subsequently calculate coordinate system transform information (for example, a coordinate system transform matrix) based on the second pose data.

S505: The server delivers the global submap to the electronic device. Correspondingly, the electronic device receives the global submap.

S506: The electronic device stores the global submap in a SLAM system of the electronic device.

S507: The electronic device calculates the coordinate system transform information, and transforms a SLAM map based on the coordinate system transform information.

Similarly, a process in which the electronic device calculates the coordinate system transform information may be as follows: The electronic device obtains the $K^{th}$ frame of image in a video image sequence collected by the camera, where the $K^{th}$ frame of image is the same as the video image sent to the server in S501; and determines a local pose (which may be referred to as first pose data herein) of the electronic device in the SLAM map in an originally constructed local coordinate system based on the $K^{th}$ frame of image and the SLAM map. For a specific implementation process, refer to descriptions about the first pose data in S305 in the embodiment in FIG. 12. For brevity of the specification, details are not described herein again.

Then, the electronic device may further obtain coordinate system transform information between a first coordinate system of the SLAM map and a second coordinate system of the global map based on the first pose data and the second pose data that is obtained in S504, where the coordinate system transform information may be, for example, a coordinate system transform matrix. For related content of the coordinate system transform matrix, refer to related descriptions in the embodiment in FIG. 13. For brevity of the specification, details are not described herein again.

S508: The electronic device performs pose calculation based on the video image collected by the camera and the global submap, to obtain the global pose of the electronic device.

S509: The electronic device displays the virtual object on a display component based on the global pose of the electronic device.

S510: The electronic device updates the SLAM map in the global coordinate system based on the global pose of the electronic device.

For related content of S508 to S510, refer to related descriptions of S306 to S308 in the embodiment in FIG. 12. For brevity of the specification, details are not described herein again.

It may be learned that, in this embodiment of this application, as the electronic device needs to first download a global submap of a corresponding area, it takes some time to download the map. To speed up user's access to an application, first global pose estimation may be completed on the server side. To be specific, the first global pose estimation is performed on the server side after the application is started. While the global pose estimation is started, the server correspondingly obtains the global submap and transmits the global submap to the electronic device. This speeds up user's access to the application. In this way, the user does not perceive a delay resulting from downloading the map, thereby improving user experience as the user does not need to wait.

All or some of the foregoing embodiments may be implemented by software, hardware, firmware, or any combination thereof. When software is used to for implementation, the embodiment may be implemented completely or partially in a form of a computer program product. The computer program product includes one or more computer instructions. When the computer program instructions are loaded and executed, all or a part of the procedures or functions are generated according to the embodiments of this application. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line) or wireless (for example, infrared, microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, a magnetic tape, or the like), an optical medium (for example, a DVD or the like), a semiconductor medium (for example, a solid-state drive), or the like.

In the foregoing embodiments, the descriptions in the embodiments have respective focuses. For a part that is not described in detail in an embodiment, refer to related descriptions in other embodiments.

What is claimed is:

1. A method for displaying a virtual object, performed by an electronic device having a display and a camera, wherein the method comprises:
   detecting an operation by a user to start an application;
   in response to the operation, downloading a global submap and storing the global submap in a simultaneous localization and mapping (SLAM) system of the electronic device, wherein the global submap is a submap corresponding to a location of the electronic device in a global map; and
   displaying a location and a posture of the virtual object on the display, wherein the location and the posture of the virtual object are calculated by the SLAM system by performing pose calculation based on at least a video image collected by the camera and the global submap.

2. The method according to claim 1, wherein the location and the posture of the virtual object are calculated by the SLAM system by performing a pose calculation at a first frequency using at least the video image collected by the camera and the global submap.

3. The method according to claim 2, wherein the pose calculation process uses the video image collected by the camera, the global submap, and motion data collected by the electronic device, to obtain the location and the posture of the virtual object, wherein the motion data comprises motion speed data and motion direction data.

4. The method according to claim 1, wherein the downloading a global submap in response to the operation comprises:
   in response to the operation, sending, to a server, indication information indicating an initial location of the electronic device; and
   receiving the global submap from the server, wherein the global submap is determined based on the initial location of the electronic device.

5. The method according to claim 4, wherein the indication information indicating the initial location of the electronic device comprises first location fingerprint information used to indicate the initial location of the electronic device, the global submap corresponds to second location fingerprint information, and the first location fingerprint information matches the second location fingerprint information.

6. The method according to claim 2, wherein the method further comprises:
   updating a SLAM map of the SLAM system based on the location and the posture of the virtual object.

7. The method according to claim 2, wherein the displaying a location and a posture of the virtual object on the display comprises:
   displaying a first interface on the display, and displaying the video image and the virtual object in the first interface based on the location and the posture of the virtual object, and the location and the posture of the virtual object is calculated by using at least the video image collected by the camera and the global submap.

8. A method for displaying a virtual object, performed by an electronic device having a display and a camera, wherein the method comprises:
   obtaining a global submap and storing the global submap in a simultaneous localization and mapping (SLAM) system of the electronic device, wherein the global submap is a submap corresponding to a location of the electronic device in a global map;
   performing pose calculation based on a video image collected by the camera and the global submap, to obtain pose data of the electronic device; and
   displaying the virtual object on the display based on the pose data of the electronic device.

9. The method according to claim 8, wherein the performing pose calculation based on the video image collected by the camera and the global submap, to obtain pose data of the electronic device comprises:
   performing pose calculation at a first frequency using at least the video image collected by the camera and the global submap, to obtain the pose data of the electronic device.

10. The method according to claim 8, wherein the performing pose calculation based on the video image collected by the camera and the global submap, to obtain pose data of the electronic device comprises:
    performing pose calculation based on the video image collected by the camera, the global submap, and motion data collected by the electronic device, to obtain the pose data of the electronic device, wherein the motion data comprises motion speed data and motion direction data.

11. The method according to claim 8, wherein the obtaining the global submap of the global map comprises:
    sending, to a server, first location fingerprint information used to indicate an initial location of the electronic device; and
    receiving the global submap from the server, wherein the global submap corresponds to second location fingerprint information, and the first location fingerprint information matches the second location fingerprint information.

12. The method according to claim 8, wherein the virtual object is a virtual object in a virtual reality VR scenario, an augmented reality AR scenario, or a mixed reality MR scenario.

13. An electronic device for displaying a virtual object, comprising:
    a display, a camera, one or more processors, a memory, a plurality of applications, and one or more computer programs, wherein the one or more computer programs are stored in the memory, the one or more computer programs comprise instructions, and when the instructions are executed by the electronic device, the electronic device is enabled to perform the following steps:
    detecting an operation by a user to start an application;
    in response to the operation, downloading a global submap and storing the global submap in a simultaneous localization and mapping (SLAM) system of the electronic device, wherein the global submap is a submap corresponding to a location of the electronic device in a global map; and
    displaying a location and a posture of the virtual object on the display, wherein the location and the posture of the virtual object are calculated by the SLAM system by performing pose calculation based on at least a video image collected by the camera and the global submap.

14. The electronic device according to claim 13, wherein location and the posture of the virtual object are calculated by the SLAM system by performing a pose calculation at a first frequency using at least the video image collected by the camera and the global submap.

15. The electronic device according to claim 13, wherein when the instructions are executed by the electronic device, the electronic device is enabled to specifically perform the following step:
   using the video image collected by the camera, the global submap, and motion data collected by the electronic device, to obtain the location and the posture of the virtual object, wherein the motion data comprises motion speed data and motion direction data.

16. The electronic device according to claim 13, wherein when the instructions are executed by the electronic device, the electronic device is enabled to specifically perform the following steps:
   in response to the operation, sending, to a server, indication information indicating an initial location of the electronic device; and
   receiving the global submap from the server, wherein the global submap is determined based on the initial location of the electronic device.

17. The electronic device according to claim 13, wherein when the instructions are executed by the electronic device, the electronic device is enabled to further perform the following step:
   updating a SLAM map of the SLAM system based on the location and the posture of the virtual object.

18. The electronic device according to claim 17, wherein when the instructions are executed by the electronic device, the electronic device is enabled to specifically perform the following steps:
   determining first pose data of the electronic device in a SLAM map in a first coordinate system based on a $K^{th}$ frame in the video image collected by the camera and the SLAM map in the first coordinate system, wherein K is an integer greater than or equal to 1;
   determining second pose data of the electronic device in a global submap in a second coordinate system based on the $K^{th}$ frame and the global submap in the second coordinate system;
   obtaining coordinate system transform information between the first coordinate system of the SLAM map and the second coordinate system of the global map based on the first pose data and the second pose data;
   transforming the SLAM map in the first coordinate system into a SLAM map in the second coordinate system based on the coordinate system transform information; and
   updating the SLAM map in the second coordinate system.

19. The electronic device according to claim 18, wherein when the instructions are executed by the electronic device, the electronic device is enabled to perform the following steps:
   performing feature extraction based on the $K^{th}$ frame, to obtain an image feature;
   performing feature matching on the image feature in the global submap in the second coordinate system, to obtain a map feature matching the image feature; and
   calculating the second pose data of the electronic device in the global submap in the second coordinate system based on the image feature and the map feature.

20. The electronic device according to claim 18, wherein when the instructions are executed by the electronic device, the electronic device is enabled to perform the following steps:
   sending the $K^{th}$ frame of image to the server; and
   receiving the second pose data from the server, wherein the second pose data is determined by the server by performing feature extraction and feature matching based on the $K^{th}$ frame of image and the global submap in the second coordinate system.

* * * * *